(12) United States Patent
Noh et al.

(10) Patent No.: US 11,575,484 B2
(45) Date of Patent: Feb. 7, 2023

(54) METHOD AND APPARATUS FOR GENERATING REFERENCE SIGNAL SEQUENCE AND FOR PERFORMING DATA SCRAMBLING IN WIRELESS COMMUNICATION SYSTEM

(71) Applicant: Samsung Electronics Co., Ltd., Suwon-si (KR)

(72) Inventors: Hoon-Dong Noh, Suwon-si (KR); Young-Woo Kwak, Suwon-si (KR); Youn-Sun Kim, Seongnam-si (KR); Cheol-Kyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 49 days.

(21) Appl. No.: 16/755,819

(22) PCT Filed: Oct. 19, 2018

(86) PCT No.: PCT/KR2018/012450
§ 371 (c)(1),
(2) Date: Apr. 13, 2020

(87) PCT Pub. No.: WO2019/078687
PCT Pub. Date: Apr. 25, 2019

(65) Prior Publication Data
US 2021/0242995 A1 Aug. 5, 2021

(30) Foreign Application Priority Data

Oct. 20, 2017 (KR) .................. 10-2017-0136944
Oct. 27, 2017 (KR) .................. 10-2017-0141058
(Continued)

(51) Int. Cl.
*H04L 5/00* (2006.01)
*H04W 72/04* (2009.01)
(Continued)

(52) U.S. Cl.
CPC ....... *H04L 5/0051* (2013.01); *H04W 72/0446* (2013.01); *H04W 72/082* (2013.01); *H04W 72/1273* (2013.01)

(58) Field of Classification Search
CPC ... H04W 28/06; H04W 68/005; H04W 80/02; H04W 80/08; H04W 72/0446;
(Continued)

(56) References Cited

U.S. PATENT DOCUMENTS

| 6,404,808 B1 * | 6/2002 | Onu ................. H04B 1/707 375/130 |
| 2010/0002804 A1 * | 1/2010 | Ogawa ............... H04L 25/0226 375/300 |

(Continued)

OTHER PUBLICATIONS

ZTE et al., On CSI-RS for CSI acquisition and beam management, Sep. 21, 2017, 3GPP TSG RAN WG1 Meeting NR#3, R1-1715448, pp. 3-4. (Year: 2017).*

(Continued)

*Primary Examiner* — Gregory B Sefcheck
*Assistant Examiner* — Joshua Smith
(74) *Attorney, Agent, or Firm* — Jefferson IP Law, LLP

(57) ABSTRACT

The present disclosure pertains to a method and an apparatus for generating a reference signal (RS) sequence and a data scrambling sequence. A method for a base station transmitting a reference signal according to an embodiment of the present disclosure may comprise the steps of: generating a reference signal sequence; and transmitting a reference signal corresponding to the generated reference signal sequence. The reference signal sequence can be generated using an initial sequence that is determined using a slot number in a transmission frame, a symbol number in a slot, and a scrambling identifier (ID).

6 Claims, 11 Drawing Sheets

(30) Foreign Application Priority Data

Dec. 14, 2017 (KR) .................. 10-2017-0172619
Jan. 9, 2018 (KR) .................. 10-2018-0002997

(51) Int. Cl.
| | | |
|---|---|---|
| *H04W 72/08* | (2009.01) | |
| *H04W 72/12* | (2009.01) | |
| *H04W 72/0446* | (2023.01) | |
| *H04W 72/1273* | (2023.01) | |

(58) Field of Classification Search
CPC ............ H04W 72/082; H04W 72/1273; H04L 29/08; H04L 47/32; H04L 47/34; H04L 1/1838; H04L 1/1841; H04L 5/0051; H04L 5/0007; H04L 5/0048; H04L 1/00; H04L 5/005; H04L 1/004; H04J 13/00; H04J 13/0029

See application file for complete search history.

(56) References Cited

U.S. PATENT DOCUMENTS

| | | | |
|---|---|---|---|
| 2012/0039409 A1* | 2/2012 | Popovic | H04L 5/0023 375/260 |
| 2014/0355408 A1* | 12/2014 | Tong | H04J 13/004 370/208 |
| 2015/0098349 A1* | 4/2015 | Wei | H04W 24/00 370/252 |
| 2015/0110047 A1 | 4/2015 | Lee et al. | |
| 2017/0202025 A1* | 7/2017 | Ouchi | H04W 52/346 |
| 2018/0048444 A1* | 2/2018 | Park | H04L 5/0053 |
| 2018/0097594 A1* | 4/2018 | Wang | H04L 5/0048 |
| 2018/0115446 A1* | 4/2018 | Adhikary | H04L 27/2613 |
| 2018/0175989 A1* | 6/2018 | Li | H04B 7/0636 |
| 2020/0162228 A1* | 5/2020 | Gao | H04L 5/0051 |
| 2021/0392022 A1* | 12/2021 | Iwai | H04L 5/0051 |

OTHER PUBLICATIONS

Huawei et al., Summary of offline discussions on CSI-RS, 3GPP TSG RAN WG1 Meeting #90bis, R1-1718947, Oct. 13, 2017, Prague, Czech Republic.

\* cited by examiner

FIG.6D

METHOD AND APPARATUS FOR GENERATING REFERENCE SIGNAL SEQUENCE AND FOR PERFORMING DATA SCRAMBLING IN WIRELESS COMMUNICATION SYSTEM

CROSS-REFERENCE TO RELATED APPLICATIONS

This application is a National Phase Entry of PCT International Application No. PCT/KR2018/012450, which was filed on Oct. 19, 2018 and claims priority to Korean patent application number 10-2017-0136944 filed on Oct. 20, 2017 and Korean patent application number 10-2017-0141058 filed on Oct. 27, 2017 and Korean patent application number 10-2017-0172619 filed on Dec. 14, 2017 and Korean patent application number 10-2018-0002997 filed on Jan. 9, 2018 in the Korean Intellectual Property Office, the contents of which are incorporated herein by reference.

TECHNICAL FIELD

The disclosure relates to a wireless communication system, and more specifically, to a method and apparatus for allowing a base station to generate a reference signal or perform data scrambling.

BACKGROUND ART

Wireless communication systems have evolved beyond voice-centered services to broadband wireless communication systems to provide high data rate and high-quality packet data services, such as 3rd generation partnership project (3GPP) high speed packet access (HSPA), long term evolution (LTE) or evolved universal terrestrial radio access (E-UTRA)), LTE-advanced (LTE-A), 3GPP2 high rate packet data (HRPD), ultra-mobile broadband (UMB), and institute of electrical and electronics engineers (IEEE) 802.16e communication standards. Further, for fifth generation (5G) wireless communication systems, 5G or new radio (NR) communication is being standardized.

As a representative example of such a broadband wireless communication system, LTE/LTE-A system adopts orthogonal frequency division multiplexing (OFDM) for downlink and single carrier frequency division multiple access (SC-FDMA) for uplink. Uplink means a wireless link where the user equipment (UE) (or mobile station (MS) transmits data or control signals to the base station (BS, or eNode B), and download means a wireless link where the base station transmits data or control signals to the UE. Such a multiple access scheme allocates and operates time-frequency resources carrying data or control information per user not to overlap, i.e., to maintain orthogonality, to thereby differentiate each user's data or control information.

DETAILED DESCRIPTION OF THE INVENTION

Technical Problem

The disclosure proposes a reference signal sequence for interference management of a mobile communication system and a method and apparatus for data scrambling. In mobile communication systems, it is common for different UEs or base stations to share the same time or frequency resource. In the case of LTE, a reference signal is scrambled based on a gold sequence with a length of 31 so as to minimize influence by interference caused between the UEs or base stations sharing the same time or frequency resource. The scrambling is initialized with different values by various input values, such as the time/frequency resource position of the reference signal, cell ID, CP length, or scrambling ID, depending on the kind of the reference signal and supports superior interference randomization capability.

Meanwhile, in the case of NR, the method of LTE scrambling cannot ensure sufficient interference management for transmission of reference signal and data due to diversified transmission environment, such as various numerologies, carrier frequencies, increased cell IDs and scrambling IDs. The disclosure provides methods for generating and initializing a reference signal and data sequence of NR by various methods, such as extending the length of reference signal sequence, modulo operation of time/frequency resource index, and adjusting a combined formula for several input values.

Specifically, the disclosure proposes a method for generating a sequence considering various factors, such as various structures of RS RE patterns, e.g., channel state information reference signal (CSI-RS) and demodulation reference signal (DMRS) and supporting various kinds of subcarrier spacing and effectively operating the increased sequence length. Also provided is a method of sequence mapping according to various RS structures, and enabling efficient transmission of radio resources via a proper sequence initializing method according to sequence properties.

Technical Solution

The disclosure proposes a method and apparatus of generating a reference signal (RS) sequence and a data scrambling sequence. According to an embodiment of the disclosure, a base station generating a demodulation reference signal (DMRS) sequence may include: a transceiver transmitting/receiving a signal to/from a UE via a radio channel and a processor determining the structure of a reference signal, controlling to generate configuration information of the reference signal to be transferred to the UE, and generating the DMRS sequence based on the generated configuration information of the reference signal.

According to an embodiment of the disclosure, a base station generating a reference signal (RS) sequence may include: a transceiver transmitting/receiving a signal to/from a UE via a radio channel and a processor generating an RS sequence based on a parameter indicated via a higher layer. The parameter may be used to adjust the sequence initialization repetition periodicity.

According to an embodiment of the disclosure, a method of transmitting a reference signal by a base station in a wireless communication system may include: generating a reference signal sequence; and transmitting a reference signal corresponding to the generated reference signal sequence.

The reference signal sequence may be generated using an initial sequence determined using a slot number in a transmission frame and a symbol number in a slot and a reference signal identifier (ID).

The reference signal identifier may be a scrambling identifier (ID).

According to an embodiment of the disclosure, a base station transmitting a reference signal in a wireless communication system may include: a transceiver; and a processor configured to control the transceiver.

The processor may generate a reference signal sequence and transmit a reference signal corresponding to the generated reference signal sequence.

The reference signal sequence may be generated using an initial sequence determined using a slot number in a transmission frame and a symbol number in a slot and a reference signal identifier (ID).

The reference signal identifier may be a scrambling identifier (ID).

According to an embodiment of the disclosure, a method of receiving a reference signal by a UE in a wireless communication system may include: receiving a reference signal corresponding to a reference signal sequence.

The reference signal sequence may be generated using an initial sequence determined using a slot number in a transmission frame and a symbol number in a slot and a reference signal identifier (ID).

The reference signal identifier may be a scrambling identifier (ID).

According to an embodiment of the disclosure, a UE receiving a reference signal in a wireless communication system may include: a transceiver; and a processor configured to control the transceiver.

The processor may receive a reference signal corresponding to a reference signal sequence.

The reference signal sequence may be generated using an initial sequence determined using a slot number in a transmission frame and a symbol number in a slot and a scrambling identifier (ID).

BRIEF DESCRIPTION OF DRAWINGS

Particular embodiments of the present disclosure and the foregoing and other aspects, features, and advantages will be apparent from the following detailed description taken in conjunction with the accompanying drawings, wherein:

FIGS. 6A to 6E are views illustrating a scheme of generating a DMRS sequence according to an embodiment of the disclosure;

It should be noted that the same or similar reference denotations may be used to refer to the same or similar elements, features, or structures throughout the drawings.

MODE FOR CARRYING OUT THE INVENTION

Figure 1:
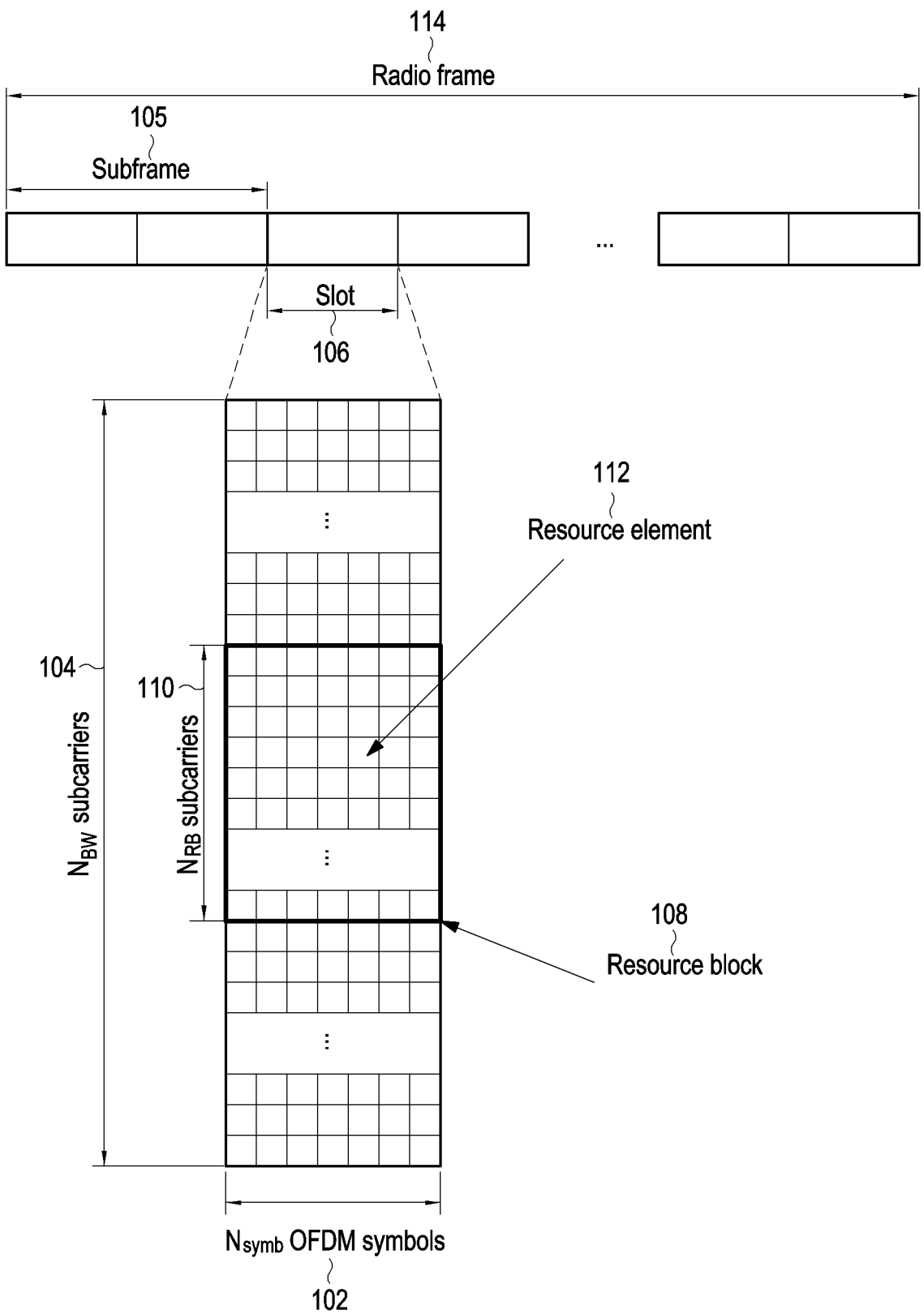
FIG. 1 is a view illustrating a basic structure of time-frequency domain which is radio resource domain where the data or control channel is transmitted on downlink in an LTE/LTE-A system.

Hereinafter, embodiments of the disclosure are described in detail with reference to the accompanying drawings.

In describing embodiments, the description of technologies that are known in the art and are not directly related to the present disclosure is omitted. This is for further clarifying the gist of the present disclosure without making it unclear.

For the same reasons, some elements may be exaggerated or schematically shown. The size of each element does not necessarily reflect the real size of the element. The same reference numeral is used to refer to the same element throughout the drawings.

Advantages and features of the present disclosure, and methods for achieving the same may be understood through the embodiments to be described below taken in conjunction with the accompanying drawings. However, the present disclosure is not limited to the embodiments disclosed herein, and various changes may be made thereto. The embodiments disclosed herein are provided only to inform one of ordinary skill in the art of the category of the present disclosure. The present disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more CPUs in a device or a security multimedia card.

Although the description of embodiments herein primarily focuses on examples of a particular system, the subject matter of the present disclosure may also be applicable to other communication systems or services having similar technical backgrounds without departing from the scope of the present disclosure, and this may be determined by one of ordinary skill in the art.

FIG. 1 is a view illustrating a basic structure of a time-frequency domain which is radio resource domain where the data or control channel is transmitted on downlink in an LTE/LTE-A system.

In FIG. 1, the horizontal axis refers to the time domain, and the vertical axis refers to the frequency domain. In the time domain, the minimum transmission unit is an OFDM symbol, and $N_{symb}$ (102) OFDM symbols come together to configure one slot 106, and two slots come together to configure one subframe 105. The slot is 0.5 ms long, and the subframe is 1.0 ms long. The radio frame 114 is a time domain section consisting of 10 subframes. In the frequency domain, the minimum transmission unit is subcarrier, and the bandwidth of the overall system transmission band consists of a total of $N_{BW}$ (104) subcarriers.

The basic resource unit in the time-frequency domain is resource element 112 (RE), and this may be represented in OFDM symbol index and subcarrier index. Resource block 108 (RB) or physical resource block (PRB) is defined with Nsymb (102) continuous OFDM symbols in the time domain and NRB (110) continuous subcarriers in the frequency domain. Accordingly, one RB 108 includes $N_{symb} \times N_{RE}$ REs (112). Generally, the minimum transmission unit of data is RB. Generally in the LTE system, $N_{symb}$=7, $N_{RB}$=12, and, $N_{BW}$ and $N_{RB}$ are proportional to the bandwidth of system transmission band. Data transmission rate is increased in proportion to the number of RBs scheduled for the terminal. The LTE system defines and operates six transmission bandwidths. For the FDD system differentiating and operating downlink and uplink with frequencies, downlink transmission bandwidth may differ from uplink transmission bandwidth. The channel bandwidth refers to an RF bandwidth corresponding to the system transmission bandwidth. Table 1 represents the correlation between system transmission bandwidth and channel bandwidth defined in the LTE system. For example, the LTE system having a 10 MHz channel bandwidth has a transmission bandwidth consisting of 50 RBs.

TABLE 1

| | Channel bandwidth $BW_{Channel}$ [MHZ] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Figure 2:
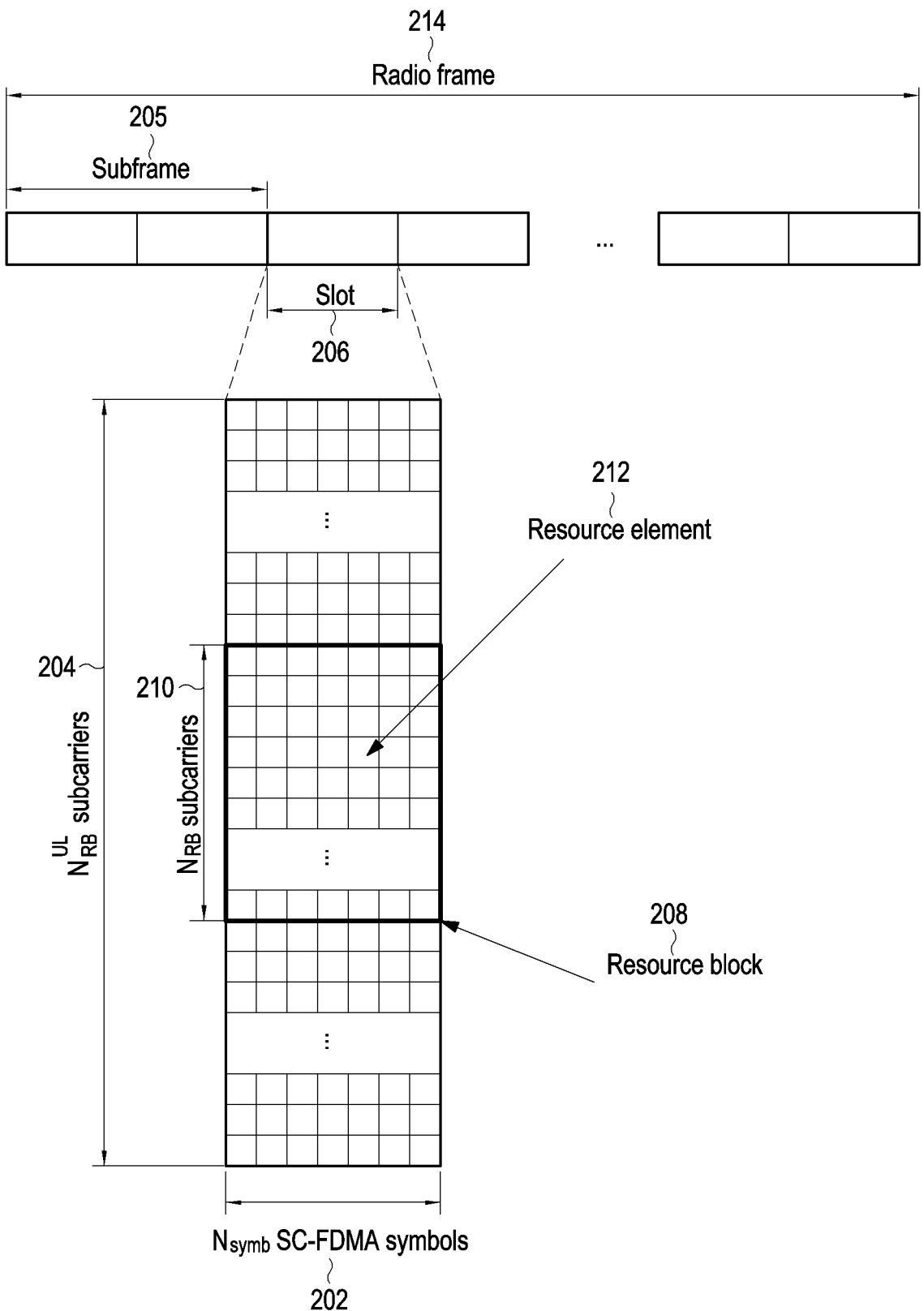
FIG. 2 is a view illustrating a basic structure of time-frequency domain which is radio resource domain where the data or control channel is transmitted on uplink in an LTE/LTE-A system.

FIG. 2 is a view illustrating a basic structure of time-frequency domain which is a radio resource domain where the data or control channel is transmitted on uplink in an LTE/LTE-A system.

Referring to FIG. 2, the horizontal axis refers to the time domain, and the vertical axis refers to the frequency domain. The minimum transmission unit in the time domain is the SC-FDMA symbol 202, and $N_{symb}^{UL}$ SC-FDMA symbols are put together into a single slot 206. The two slots are put together into one subframe 205. In the frequency domain, the minimum transmission unit is subcarrier, and the bandwidth of the overall system transmission band 204 consists of a total of $N_{BW}$ subcarriers. $N_{BW}$ is in proportion to the system transmission bandwidth.

The basic resource unit in the time-frequency domain is resource element (RE) 212, and this may be defined with SC-FDMA symbol index and subcarrier index. The resource block (RB) pair 208 is defined with $N_{symb}^{UL}$ consecutive SC-FDMA symbols in the time domain and $N_{SC}^{RB}$ consecutive subcarriers in the frequency domain. Thus, one RB consists of $N_{symb}^{UL} \times N_{sc}^{RB}$ REs. Generally, the minimum transmission unit of data or control information is the RB. The PUCCH is mapped to the frequency domain corresponding to one RB and is transmitted during one subframe.

The new radio (NR) system also supports downlink/uplink structures similar to those shown in FIGS. 1 and 2. NR supports more flexible structures on the time axis over LTE. Specifically, NR supports a slot structure consisting of 14 OFDM symbols and non-slot structures consisting of one, two, three, four, or seven OFDM symbols. The non-slot structure may also be denoted a mini-slot structure.

Figure 3:
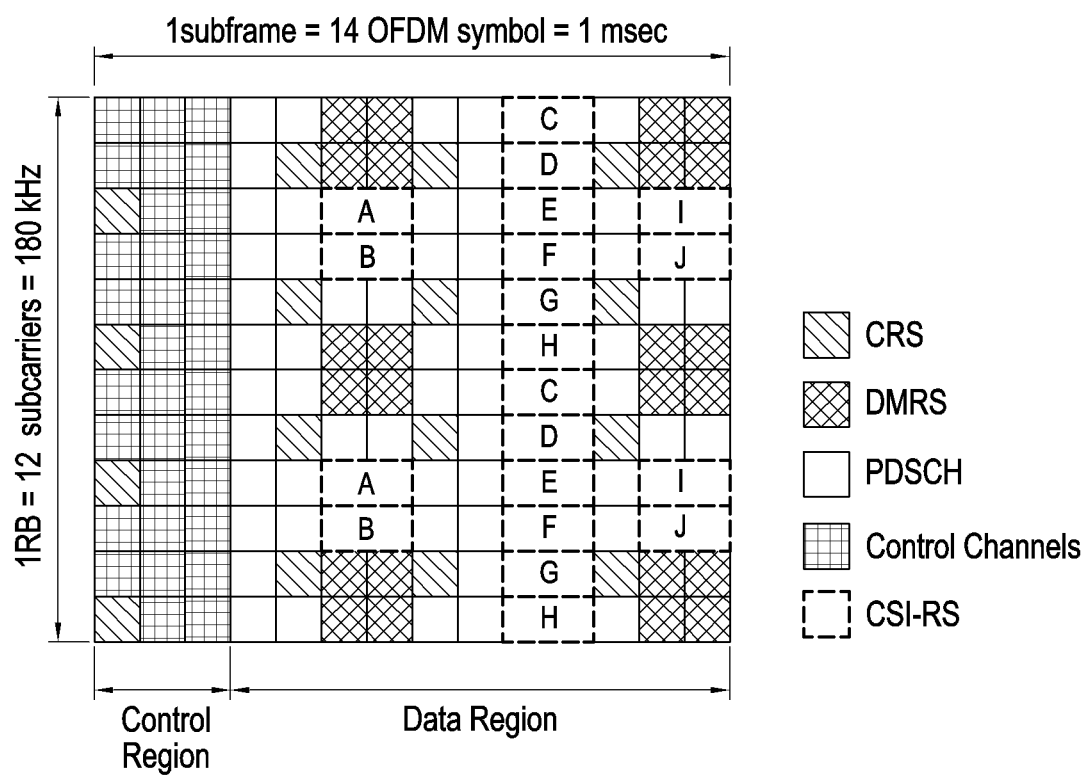
FIG. 3 is a view illustrating a 1RB radio resource which is the minimum unit schedulable on a downlink in an LTE/LTE-A system.

FIG. 3 is a view illustrating a 1RB radio resource which is the minimum unit schedulable on a downlink in an LTE/LTE-A system. A plurality of different types of signals as follows may be transmitted through the radio resource shown in FIG. 3.

1. Cell specific RS (CRS): a reference signal that is periodically transmitted for all the UEs belonging to one cell and that may be shared by a plurality of UEs.

2. Demodulation reference signal (DMRS): a reference signal transmitted for a particular UE. This signal is transmitted only when data is transmitted to the corresponding UE. A DMRS may consist of a total of eight DMRS ports. In the LTE/LTE-A, port 7 to port 14 correspond to DMRS ports, and the ports maintain orthogonality using the CDM or FDM in order not to cause mutual interference.

3. Physical downlink shared channel (PDSCH): a data channel transmitted on downlink, used for a base station to transmit traffic to a UE, and transmitted via an RE where no reference signal is transmitted in the data region of FIG. 3.

4. Channel status information reference signal (CSI-RS): a reference signal transmitted for UEs belonging to one cell and used to measure the channel status. A plurality of CSI-RSs may be transmitted in one cell.

5. Other control channels (PHICH, PCFICH, PDCCH): these channels are used to transmit ACKs/NACKs to operate the HARQ for uplink data transmission or to provide control information necessary for the UE to receive the PDSCH.

Figure 4:
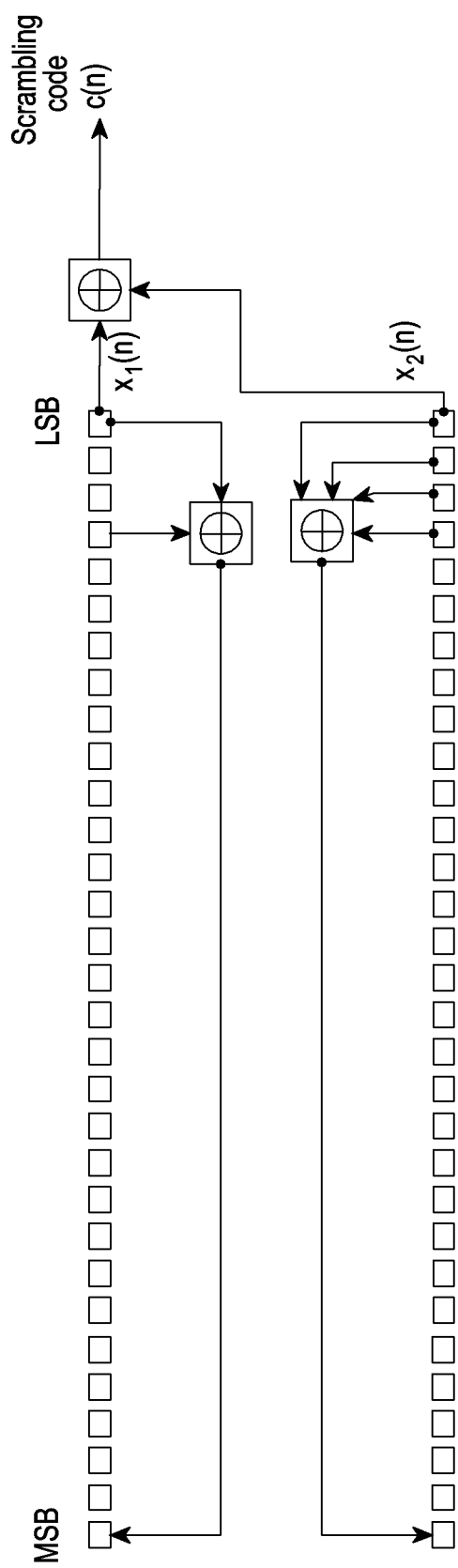
FIG. 4 is a view illustrating a process of generating a scrambling code according to an embodiment of the disclosure.
Figure 6A:
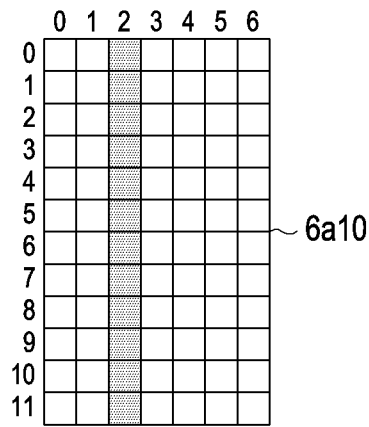
Figure 6A:
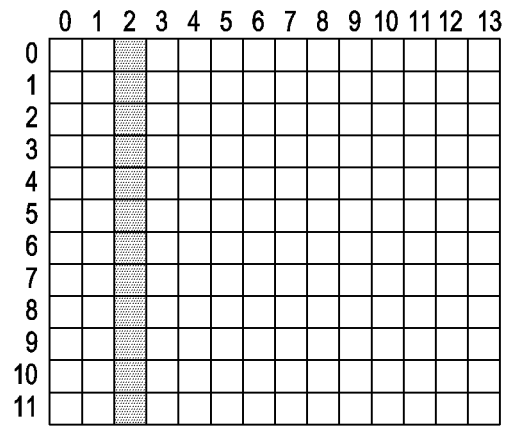
Figure 6A:
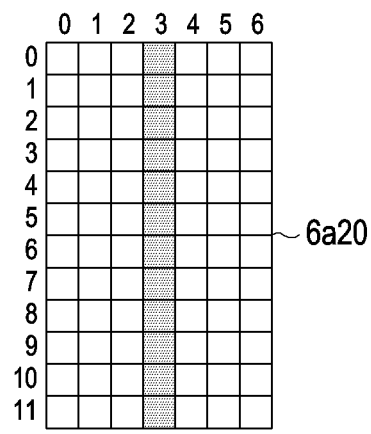
Figure 6A:
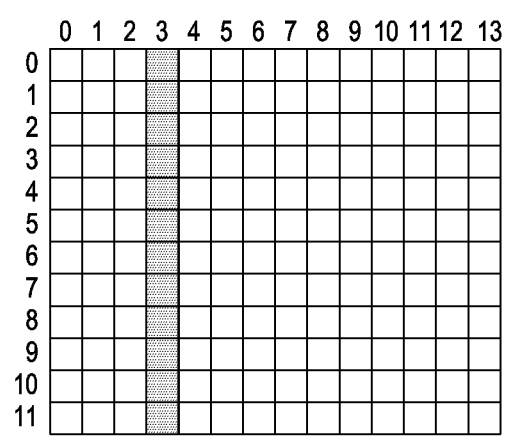
Figure 6A:
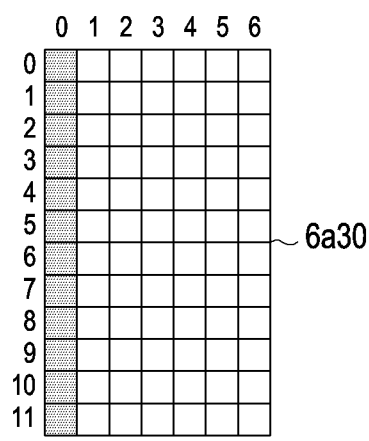
Figure 6A:
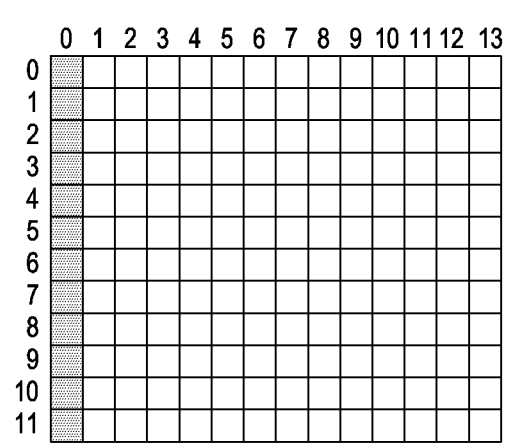

In the case of LTE, a reference signal sequence, such as the CRS, DMRS, or CSI-RS, and a sequence for scrambling various channels such as PDCCH, PDSCH, or PMCH may be generated as a pseudo-random (PN) sequence based on a gold sequence with a length of 31 as shown in FIG. 4. More specifically, as shown in FIG. 6D, from a higher register's polynomial $D^{31}+D^3+1$, a first m-sequence $x_1(n)$ is generated and, from a lower register's polynomial $D^{31}+D^3+D^2+D+1$, a second m-sequence $x_2(n)$ is generated, and the first and second m-sequences are conjugated to generate a PN sequence C (n), which may be expressed as in the following equation. This may be described with reference to FIG. 4.

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{Equation 1}$$

Here, $N_C=1600$, and the register initialization is performed as follows.

The first m-sequence $x1(n)$ generated from the higher register is initialized as the following fixed pattern $x_1(0)=1$, $x_1(n)=0$, $n=1, 2, \ldots, 30$.

The second m-sequence $x2(n)$ generated from the lower register is initialized as in the following equation by the scrambling condition required by each signal.

$$c_{init} = \sum_{i=0}^{30} x_2(i) \cdot 2^i \quad \text{Equation 2}$$

In Equation 2 above, $C_{init}$ may be determined with a different method applied depending on the detailed application.

As an example, to each codeword q, the bit block $b^{(q)}(0), \ldots, b^{(q)}(M_{bit}^{(q)}-1)$ is scrambled by Equation 3. Here, $M_{bit}^{(q)}$ be is the number of bits included in codeword q transmitted in one slot on the channel (PDSCH, PDCCH, or PMCH).

$$\tilde{b}^{(q)}(i)=(b^{(q)}(i)+c^{(q)}(i)) \bmod 2 \quad \text{Equation 3}$$

In Equation 3, the scrambling sequence $c^{(q)}(i)$ is determined by Equation 1, and the scrambling sequence is initialized by $c_{init}$ at the start of each subframe. At this time, $c_{init}$ is determined by Equation 4 depending on the kind of the transport channel.

$$c_{init} = \begin{cases} n_{RNTI} \cdot 2^{14} + q \cdot 2^{13} + \lfloor n_s/2 \rfloor \cdot 2^9 + N_{ID}^{cell} & \text{for } PDSCH \\ \lfloor n_s/2 \rfloor \cdot 2^9 + N_{ID}^{MBSFN} & \text{for } PMCH \end{cases} \quad \text{Equation 4}$$

Here, $n_{RNTI}$ is the radio network temporary identifier (RNTI) allocated upon PDSCH transmission, and $n_s$ is the slot number in the transmission frame, $N_{ID}^{cell}$ is the Cell ID, and $N_{ID}^{MBSFN}$ is the MBSFN area identity. Since up to two codewords may be transmitted in one subframe, $q \in \{0,1\}$. If a single codeword is transmitted, q is 0.

The block $\tilde{b}^{(q)}(0), \ldots, \tilde{b}^{(q)}(M_{bit}^{(q)}-1)$ of bits scrambled by Equation 3 goes through modulation, codeword-to-layer mapping, precoding, or other proper procedures depending on the context and is then mapped to the RE and is transmitted.

As another example, the CRS has a slot number of $n_s$ in one radio frame, and the reference signal with the OFDM symbol number of l in the slot has a sequence as expressed in Equation 5.

$$r_{l,n_s}(m) = \frac{1}{\sqrt{2}}(1 - 2 \cdot c(2m)) + j\frac{1}{\sqrt{2}}(1 - 2 \cdot c(2m + 1)), \quad \text{Equation 5}$$

$$m = 0, 1, \ldots, 2N_{RB}^{max,DL} - 1$$

At this time, c(i) is determined by Equation 1, and is initialized by $c_{init}$ at the start of each OFDM symbol. At this time, $c_{init}$ is determined by Equation 6.

$$c_{init}=2^{10} \cdot (7 \cdot (n_s+1)+l+1) \cdot (2 \cdot N_{ID}^{cell}+1)+2 \cdot N_{ID}^{cell}+N_{CP} \quad \text{Equation 6}$$

In Equation 6, $N_{CP}$ is 1 in the case of normal CP and 2 in the case of extended CP.

The CRS sequence generated by Equation 5 is mapped to the reference signal for slot $n_s$ antenna port P.

$$a_{k,l}^{(p)}=r_{l,n_s}(m') \quad \text{Equation 7}$$

Here, subcarrier number k, OFDM symbol number l, and sequence number m' have the following relationship.

$$k = 6m + (v + v_{shift}) \bmod 6 \quad \text{Equation 8}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

In Equation 8, the variables v and $v_{shift}$ define the position of reference signal on the frequency axis as expressed in Equation 9, according to l and p.

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases} \quad \text{Equation 9}$$

$$\text{and } v_{shift} = N_{ID}^{cell} \bmod 6$$

As another example, in the case of LTE DMRS, to transmit the DMRs port p=5, Equation 2 is expressed as Equation 10.

$$c_{init}=(\lfloor n_s/2 \rfloor+1) \cdot (2N_{ID}^{cell}+1) \cdot 2^{16}+n_{RNTI} \quad \text{Equation 10}$$

In Equation 10, $n_s$ denotes the slot number in the transmission frame, and $n_{RNTI}$ denotes the UE ID. And, $N_{ID}^{cell}$ denotes the Cell ID. In contrast, to transmit the DMRS port $p \in \{7, 8, \ldots, 14\}$, Equation 2 is expressed as Equation 11.

$$c_{init}(\lfloor n_s/2 \rfloor+1) \cdot (2n_{ID}^{(nSCID)}+1) \cdot 2^{16}+n_{SCID} \quad \text{Equation 11}$$

In Equation 10, $n_s$ denotes the slot number in the transmission frame, $n_{SCID}$ denotes the Scrambling ID which is 0 or 1, and unless mentioned specifically, Scrambling ID is assumed to be 0. Further, $n_{ID}^{(i)}$, i=0,1 is determined as follows.

$n_{ID}^{(i)}=N_{ID}^{cell}$ if no value for $n_{ID}^{DMRS,i}$ is provided by higher layers or if DCI format 1A, 2B or 2C is used for the DCI associated with the PDSCH transmission $n_{ID}^{(j)}=n_{ID}^{DMRS,i}$ otherwise As described above, the DMRS is initialized every subframe, and the reference signal for transmitting the DMRS port $p \in \{7, 8, \ldots, 14\}$ is expressed as Equation 12.

$$r(m) = \frac{1}{\sqrt{2}}(1 - 2 \cdot c(2m)) + j\frac{1}{\sqrt{2}}(1 - 2 \cdot c(2m + 1)), \quad \text{Equation 12}$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

Here, $N_{RB}^{max,DL}=110$ denotes the maximum number of RBs supported for DL in the LTE system. Further, since the LTE system uses a fixed DMRS pattern for each of normal CP and extended CP, a DMRS sequence is generated as expressed in Equation 11, considering the number of DMRS REs per PRB.

As another example, the LTE CSI-RS has a slot number of $n_s$ in one radio frame, and the reference signal with the OFDM symbol number of l in the slot has a sequence as expressed in Equation 13.

$$r_{l,n_s}(m) = \frac{1}{\sqrt{2}}(1-2\cdot c(2m)) + j\frac{1}{\sqrt{2}}(1-2\cdot c(2m+1)), \quad \text{Equation 13}$$

$$m = 0, 1, \ldots, N_{RB}^{max,DL} - 1$$

At this time, c(i) is determined by Equation 1, and is initialized by $c_{init}$ at the start of each OFDM symbol. At this time, $c_{init}$ is determined by Equation 14.

$$c_{init}=2^{10}\cdot(7\cdot(n_s+1)+l+1)\cdot(2\cdot N_{ID}^{CSI}+1)+2\cdot N_{ID}^{CSI}+N_{CP} \quad \text{Equation 14}$$

In Equation 14, $N_{CP}$ is 1 in the case of normal CP and 2 in the case of extended CP. $N_{ID}^{CSI}$ In this case, it may be separately configured via high layer signaling and, unless configured by high layer signaling, it has a value of $N_{ID}^{cell}$.

Based on Equation 13, for the antenna port p, the reference signal sequence $r_{l,n_s}^{(m)}$ as expressed in Equation 15 below is mapped.

$$a_{k,l}^{(p)} = w_{l''}\cdot r_{l,n_s}(m') \quad \text{Equation 15}$$

Here, orthogonal cover code (OCC) $w_{l''}$, subcarrier number k, OFDM symbol number l, and sequence number m' have the following relationship.

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20.\}, \text{ extended cyclic prefix} \\ -9 & \text{for } p \in \{21, 22\}, \text{ extended cyclic prefix} \end{cases} \quad \text{Equation 16}$$

$$l = l' + \begin{cases} l'' & \text{CSI reference signal configurations } 0-19, \\ & \text{normal cyclic prefix} \\ 2l'' & \text{CSI reference signal configurations } 20-31, \\ & \text{normal cyclic prefix} \\ l'' & \text{CSI reference signal configurations } 0-27, \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

Unlike LTE systems, 5G wireless communication considers increased cell IDs, increased channel bandwidths, supporting various subcarrier spacings, supporting slot-based transmission and slot aggregation, and various reference signal RE mapping structures. Thus, given this, it is obvious that the method of generating a reference signal and scrambling sequence is varied as well.

Figure 5:
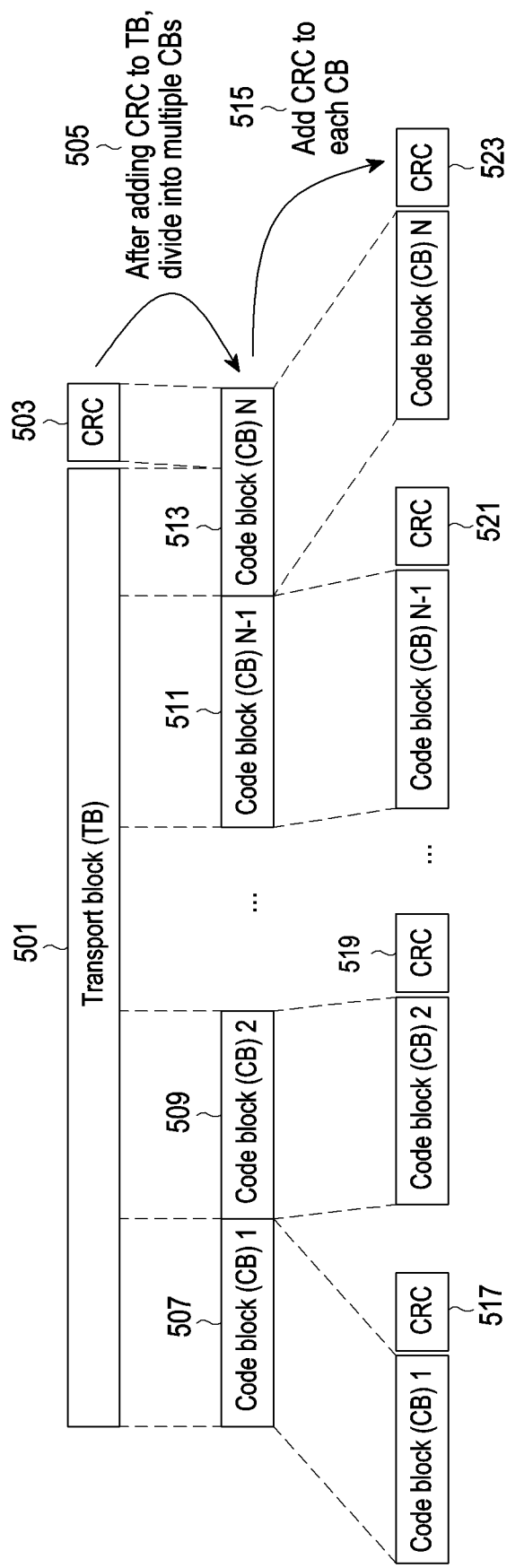
FIG. 5 is a view illustrating a process in which one transport block (TB) is divided into several code blocks (CBs), and a CRC is added according to an embodiment of the disclosure.

FIG. 5 is a view illustrating a process in which one transport block (TB) is divided into several code blocks (CBs), and a CRC is added. The transport block may be the unit of data transferred by a higher layer.

Referring to FIG. 5, one transport block (TB) 5-01 to be transmitted on the uplink or downlink may have a CRC 5-03 added to the head or tail. The CRC may have a fixed number of bits, e.g., 16 bits or 24 bits, or a variable number of bits depending on, e.g., channel context, and be used to determine whether channel coding succeeds. The TB- and CRC-added block 5-01 and 5-03 may be divided into several codeblocks (CBs) 5-07, 5-09, 5-11, and 5-13 (5-05). The maximum size of each codeblock may be predetermined in which case the last codeblock 5-13 may be smaller in size than the other codeblocks or may be adjusted to have the same length as the other codeblocks by putting 0, a random number, or 1 therein. CRCs 5-17, 5-19, 5-21, and 5-23 may be individually added to the codeblocks (5-15). The CRC may have a fixed number of bits, e.g., 16 bits or 24 bits and be used to determine whether channel coding succeeds. However, the CRC 5-03 added to the TB and the CRCs 5-17, 5-19, 5-21, and 5-23 added to the codeblocks may be omitted depending on the kind of channel code to be applied to the codeblocks. For example, if not a turbocode, but an LDPC code is applied to the codeblocks, the CRCs 5-17, 5-19, 5-21, and 5-23 to be added per codeblocks may be omitted. However, even when the LDPC is applied, the CRCs 5-17, 5-19, 5-21, and 5-23 may be added to the codeblocks as they are. Further, when a polar code is used, the CRCs may also be added or omitted. Table 2 below shows an example of CB count. Table 2 shows an example in which the CB count is approximately obtained by Roundup(Mod×CR×RB×12×14)/8448). Here, 8,448 may indicate the maximum number of information bits that may be configured in one codeblock and be channel-coded with the LDPC code. Depending on the kind of base graph of the LDPC code, it may be 8,448 or 3,840.

TABLE 2

| Case | Modulation | Coding rate | # of RBs | # of CBs |
|------|------------|-------------|----------|----------|
| 1 | 2 (QPSK) | 0.5 | 30 | 1 |
| 2 | 2 (QPSK) | 0.6 | 10 | 1 |
| 3 | 2 (QPSK) | 0.6 | 50 | 2 |
| 4 | 4 (16QAM) | 0.7 | 10 | 1 |
| 5 | 4 (16QAM) | 0.7 | 20 | 2 |
| 6 | 6 (64QAM) | 0.6 | 15 | 2 |
| 7 | 6 (64QAM) | 0.85 | 50 | 6 |

Since in the NR system using the LDPC code, base graph 1 (BG1) or base graph 2 (BG2) may be used depending on target coderate R and TB size (TBS), the number C of codeblocks may be calculated as follows. The maximum codeblock size of BG1 may be 8,448, and the maximum codeblock size of BG2 may be 3,840. Further, if the TBS is equal to or smaller than 3,824, a 16-bit CRC may be added to the TB and, if the TBS is larger than 3,824, a 24-bit CRC may be added. It is assumed that the size of TB required to transmit A is TBS. In the following, $R_1$ may be ¼.

[Start]

If $R \leq R_1$,

If $A \leq 3824$, $B = A + 16$ $C = 1$

Else $B = A + 24$ $C = \left\lceil \dfrac{B}{3840 - 24} \right\rceil$

End if of $A$

Else

If $A \leq 3824$, $B = A + 16$

Else $B = A + 24$

End if of $A$ $C = \left\lceil \dfrac{B}{8448 - 24} \right\rceil$

End if of $R$

[End]

Unlike the LTE system that transmits/receives HARQ-ACK feedback in TB units and performs retransmission in TB units, for more efficient use of frequency-time resources, HARQ-ACK feedback information is transmitted/received in units of CB or codeblock group (CBG) which is smaller than TB, and retransmission may also be performed in units of CBG. If transmission of some CBGs fails after the transmit end initially transmits one TB, transmission may be performed only on the failed CBGs when retransmission is carried out. When the CBGs are transmitted in retransmission, CBG index information may also be included and transmitted. Thus, the receive end, upon receiving the data corresponding to the retransmission, may determine that it is per-CBG retransmission, identify the CBG index information, and then perform CBG decoding in combination with the initial transmission.

Per-CBG retransmission is described below in greater detail. It is assumed that the CBG count as set, or the maximum CBG count as set is N_{CBG,max}. N_{CBG, max} may be interchangeably used with $N_{CBG,max}$. It is assumed that the number of CBs included in the scheduled TB is C. By comparing the maximum CBG count as set with the number of CBs, the number M of CBGs included in the TB may be obtained from M=min($N_{CBG,max}$, C).

After the number of CB groups M is determined, the CBs are sequentially included in the groups.

For example, it is assumed that the total CB count is C. K+ and K− may be calculated as follows.

$$K_+ = C - \lfloor C/M \rfloor \cdot M \qquad \text{Equation 17}$$

$$K_- = M - K_+ \qquad \text{Equation 18}$$

The first K+ CB groups include $\lceil C/M \rceil$ CBs, and the other K− CB groups include $\lfloor C/M \rfloor$ CBs. The above method may be intended for making the number of CBs included in each CBG as even or uniform as possible.

After configuring the C CBs into M CB groups, each CB group indicator with a M-bit bit field and CB group NDI may be generated. The nth bit in the CB group indicator denotes the CBs belonging to the nth CB group, and the mth bit in the CB group NDI denotes the CBs belonging to the mth CB group. For example, if the number C of CBs is 15, and M is 4, then K+ is 3, and K− is 1. That is, three CB groups include $\lceil C/M \rceil = \lceil 15/4 \rceil = 4$ CBs, and one CB group includes $\lfloor C/M \rfloor = \lfloor 15/4 \rfloor = 3$ CBs. Thus, CB 1 to CB 4 belong to CB group 1, CB 5 to CB 8 belong to CB group 2, CB 9 to CB 12 belong to CB group 3, and CB 13 to CB 15 belong to CB group 4. In the above example, CBs are sequentially included in the CB group. However, a modification may be made thereto so that the CBs are included in the CB group according to a particular rule.

Upon receiving data, the UE configures a bit field for HARQ-ACK information of the same size as the number M of CB groups as described above, and the bits in the bit field are included in the control information for scheduling to be used as information indicating whether each CB group is successfully transmitted, or the bit field may be transferred from the UE to the base station to be used as HARQ-ACK feedback information. For example, if the number C of CBs is 15, and M is 4, then K+ is 3, and K− is 1. That is, three CB groups include $\lceil C/M \rceil = \lceil 15/4 \rceil = 4$ CBs, and one CB group includes $\lfloor C/M \rfloor = \lfloor 15/4 \rfloor = 3$ CBs. Thus, CB 1 to CB 4 belong to CB group 1, CB 5 to CB 8 belong to CB group 2, CB 9 to CB 12 belong to CB group 3, and CB 13 to CB 15 belong to CB group 4. That is, the UE transmits the M-bit HARQ-ACK feedback to the base station using an uplink control channel. If transmission of CB group i succeeds, the ith bit in the M-bit HARQ-ACK feedback is set to 1 and, if transmission of CB group i fails, the ith bit in the M-bit HARQ-ACK feedback is set to 0.

Hereinafter, embodiments of the disclosure are described in detail.

Further, although an LTE or LTE-A system is described in connection with embodiments of the present disclosure, as an example, embodiments of the present disclosure may also apply to other communication systems with similar technical background or channel form. For example, embodiments of the disclosure may also be applicable to post-LTE-A, 5G mobile communication technology (e.g., new radio (NR)). More specifically, the default structures in the time-frequency domain where signals are transmitted on the downlink and uplink may differ from those shown in FIGS. 1 and 2. The kind of signals transmitted on the downlink and uplink may differ as well. For example, as compared with LTE, NR may support additional reference signals, such as phase tracking RS (PT-RS) and time/frequency tracking RS (TRS) and configure CSI-RS and DMRS in other various forms. Further, embodiments of the present disclosure may be modified in such a range as not to significantly depart from the scope of the present disclosure under the determination by one of ordinary skill in the art and such modifications may be applicable to other communication systems.

When determined to make the subject matter of the present disclosure unclear, the detailed description of the known art or functions may be skipped. The terms as used herein are defined considering the functions in the present disclosure and may be replaced with other terms according to the intention or practice of the user or operator. Therefore, the terms should be defined based on the overall disclosure. Hereinafter, the base station may be an entity allocating resource to a terminal and may be at least one of eNodeB, Node B, BS (base station), wireless access unit, base station controller, or node over network. The terminal may include a UE (user equipment), MS (mobile station), cellular phone, smartphone, computer, or multimedia system capable of performing communication functions. According to the present disclosure, downlink (DL) refers to a wireless transmission path of a signal transmitted from the base station to the terminal, and uplink (UL) refers to a wireless transmission path of a signal transmitted from the terminal to the base station.

Data scrambling described below encompasses scrambling applied to bit sequences including information which is not a predetermined signal, such as a reference signal or sync signal, and be referred to by other various terms, such as PDSCH scrambling, PUSCH scrambling, or PMCH scrambling.

As used below, CSI-RS denotes a reference signal that is transmitted from the base station to allow the UE to measure downlink channel state information, and the UE may perform various operations, such as CSI reporting, beam management, UE mobility related reporting, etc., by way of CSI-RS.

As used below, SRS denotes a reference signal that is transmitted from the UE to allow the base station to measure uplink channel state information, and the base station may perform various operations, such as uplink beamforming, determining the direction of precoding, and informing the UE of the same, or other various operations, by way of CSI-RS.

As used below, DMRS is a reference signal that is transmitted, with UE-specific precoding applied to a reference signal, to allow the UE to perform demodulation even without receiving additional precoding information, and adopts the same name as used in LTE systems. However, DMRS may be replaced with other terms depending on the user's intent or the purpose of using the reference signal. For example, DMRS may be interchangeably used with UE-specific RS or dedicated RS.

More specifically, the terms data scrambling/CSI-RS/DMRS/SRS are merely an example for a better understanding of the disclosure and easier description of the techniques in the disclosure, and it is apparent to one of ordinary skill in the art that the above-described operations may be performed with other terms based on the technical spirit of the disclosure.

In a first embodiment of the disclosure as described below, a method of uplink or downlink data scrambling is described. In a second embodiment of the disclosure, a method is proposed for effectively operating the increased reference signal sequence length upon generating a reference signal sequence in the NR system. In a third embodiment of the disclosure, a method of generating and initializing a reference signal sequence TRS-specifically in the NR system is described. In a fourth embodiment of the disclosure, a method of generating and initializing a reference signal sequence resource-specifically in the NR system is described.

First Embodiment

In the first embodiment, a method of performing data scrambling in the NR system is proposed. Similar to LTE, NR may perform data scrambling using a PN sequence. In this case, the PN sequence may be generated based on various lengths of gold sequences, such as length-31 Gold sequence or length-63 Gold sequence. In the instant embodiment, $c_{init}$ configuration methods for initializing the sequence based on the length-31 gold sequence with an LFSR structure as expressed in Equation 1 are provided.

As an example, PDSCH scrambling needs 1) the capability of independent interference randomizing per RNTI kind, 2) the capability of independent interference randomizing per codeword upon transmission of one or more codewords, 3) the capability of independent interference randomizing per specific time unit, e.g., slot or OFDM symbol, and 4) the capability of independent interference randomizing per specific space unit, e.g., cell/beam/TRP.

Thus, in the first example for PDSCH scrambling, based on the four parameters $n_{RNTI}$, $q$, $n_s$, and $N_{ID}^{cell}$, $c_{init}$ is defined. At this time, $n_{RNTI}$ has a 16-bit payload, $q$ has one-bit payload to differentiate up to two codewords, and $N_{ID}^{cell}$ has a 10-bit payload since it has values from 0 to 1007. Meanwhile, in the case of $n_s$, since the NR system supports numerologies as shown in Table 2, the number of slots in one frame constituted of 10 subframes with 1 ms duration is as shown in Table 4. In Table 4, $N_{slot}^{frame,\mu}$ is the number of slots included in one frame, i.e., 10 ms, and $N_{slot}^{subframe,\mu}$ is the number of slots included in one subframe, i.e., 1 ms.

TABLE 3

| μ | Δf = $2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Table 3 shows supported transmission numerologies.

TABLE 4

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Table 4 shows the number of OFDM symbols per slot $N_{symb}^{slot}$ for normal cyclic prefix, meaning that if the slot number $n_s$ is defined based on one frame like in LTE, the maximum value of $n_s$ may be varied depending on numerologies. Thus, the following two methods may be considered in applying the slot number or OFDM symbol number to $c_{init}$.

Assuming the possible maximum value, i.e., $N_{slot}^{frame,\mu}=320$, the payload of $n_s$ may be defined as 9 bits (i.e., $n_s \in \{0,1,\ldots,N_{slot}^{frame,\mu}-1\}$). In this case, is defined as expressed in Equation 19.

$$c_{init} = n_{RNTI} 2^{20} + q2^{19} + n_s \cdot 2^{10} + N_{ID}^{cell} \qquad \text{Equation 19}$$

Meanwhile, $c_{init}$ based on Equation 19 has a payload of a total of 36 bits and thus has a larger length than LFSR-31 Gold sequence. To adjust this, a modification as expressed in Equation 20 is needed.

$$c_{init} = n_{RNTI} 2^A + q \cdot 2^B + \lfloor n_s/N_{slot}^{subframe,\mu} \rfloor \cdot 2^C + N_{ID}^{cell} \qquad \text{Equation 20}$$

In this example, it should be noted that sequence initialization has been assumed to be performed at the start of each slot. Although in this example, it has been assumed that A=15, B=14, and C=10 considering the above-discussed payload of $q$, $n_s$, $N_{ID}^{cell}$, upon actual application, the exact values may be modified depending on determination of the payload per parameter.

Meanwhile, in Equation 20, when μ1, adjacent slots use the same $c_{init}$. Thus, interference randomizing performance may be deteriorated. This is why if one slot correlation with the interference sequence is high, the subsequent, consecutive $N_{slot}^{subframe,\mu}-1$ slots may be likewise influenced by the high correlation of interference. To avoid this, an additional modification as expressed in Equation 21 may be considered.

$$c_{init}=n_{RNTI} \cdot 2^A+q \cdot 2^B+(n_s \bmod N_{slot}^{subframe,\mu}) \cdot 2^C + N_{ID}^{cell} \quad \text{Equation 21}$$

In this example, it should be noted that sequence initialization has been assumed to be performed at the start of each slot. Although in this example, it has been assumed that A=15, B=14, and C=10 considering the above-discussed payload of q, $n_s$, $N_{ID}^{cell}$, upon actual application, the exact values may be modified depending on determination of the payload per parameter. According to Equation 21, sequence initialization is applied differently, but it is repeated every $N_{slot}^{subframe,\mu}$th slot. Thus, if the $N_{slot}^{subframe,\mu}$ value is large, there may be a likelihood of occurrence of an issue due to the high correlation with the interference sequence as expressed in Equation 20.

$$c_{init}=n_{RNTI} \cdot 2^A+q \cdot 2^B+(\{n_s \cdot N_{ID}^{cell}\} \bmod N_{slot}^{subframe,\mu}) \cdot 2^C + N_{ID}^{cell} \quad \text{Equation 22}$$

In this example, it should be noted that sequence initialization has been assumed to be performed at the start of each slot. Although in this example, it has been assumed that A=15, B=14, and C=10 considering the above-discussed payload of q, $n_s$, $N_{ID}^{cell}$, upon actual application, the exact values may be modified depending on determination of the payload per parameter. Equation 22 is a variation to Equation 21 and is an example of allowing each cell to use a different repetitive pattern by multiplying the slot number by the cell ID to address the issue with Equation 21 (the initialized value repeated every $N_{slot}^{subframe,\mu}$th slot).

$$c_{init}=n_{RNTI} \cdot 2^A+q \cdot 2^B+(\{n_s \cdot [2N_{ID}^{cell}+1]\} \bmod N_{slot}^{subframe,\mu}) \cdot 2^C + N_{ID}^{cell} \quad \text{Equation 24}$$

In this example, it should be noted that sequence initialization has been assumed to be performed at the start of each slot. Although in this example, it has been assumed that A=15, B=14, and C=10 considering the above-discussed payload of q, $n_s$, $N_{ID}^{cell}$ and arrangement of the parameters, upon actual application, the exact values may be modified depending on determination of the payload per parameter and arrangement of parameters. Equation 23 is another variation to Equation 21 and is an example in which to address the issue with Equation 21 (the initialized value repeated every $N_{slot}^{subframe,\mu}$th slot), the slot number is multiplied by $2N_{ID}^{cell}+1$ to allow a different repetitive pattern to be used per cell.

In the examples from Equation 20 to Equation 23, the length $M_{bit}^{(q)}$ of the bit block targeted in performing the scrambling of Equation 3 was defined as the number of bits included in the codeword q transmitted in one slot on the channel (PDSCH, PDCCH, or PMCH). Meanwhile, as set forth above, in NR, slot or non-slot structures may be mixed and, in this case, different lengths of scrambling sequences negatively influence interference randomizing. To reduce performance deterioration due to uneven interference randomization, it may be agreed that $M_{bit}^{(q)}$ may be smaller than the number of bits included in codeword q transmitted in one slot. As an example, 1) the length $M_{bit}^{(q)}$ of the bit block for scrambling may be defined as the number of bits included in codeword q transmitted in one OFDM symbol, 2) the length $M_{bit}^{(q)}$ of the bit block for scrambling may be defined as the number of bits included in codeword q transmitted in one codeblock (CB), or 3) the length $M_{bit}^{(q)}$ of the bit block for scrambling may be defined as the number of bits included in codeword q transmitted in one codeblock group (CBG). If one example of 1), 2), and 3) is applied to Equations 20 to 23, the terms related to $n_s$ in Equations 20 to 23 are extended as follows.

$$\ldots +(L(n_s+1)+l+1) \cdot 2^C + \ldots \quad \text{Equation 24}$$

In Equation 24, L may be agreed on as 1) the number of OFDM symbols, 2) the number of CBs, or 3) the number of CBGs in one slot according to the above examples, and l may also be agreed on as 1) OFDM symbol number, 2) CB number, or 3) CBG number according to the above examples.

The UE may receive the PDSCH to receive, e.g., RMSI, SIB, or paging, even before RRC configured by the base station. Similarly, the UE may transmit the PUSCH for message 3 (Msg3) even before RRC configured by the base station. In this case, since the UE has no RRC information configured by the base station, the UE need assume default values for some parameters in calculating $c_{init}$ of the examples. As an example, if the UE is not particularly assigned RNTI to be used for PDSCH or PUSCH scrambling by the base station, in the above examples, $n_{RNTI}$ may be agreed to be defined by C-RNTI.

In the second example for PDSCH scrambling, based on additional parameter(s) other than $n_{RNTI}$, q, $n_s$, and $N_{ID}^{cell}$, $c_{init}$ is defined. The additional parameters may be configured by high layer signaling, and specific contents may be SSB ID (I_SSB), or bandwidth part ID (BWP_ID), or carrier ID (C_ID), or a random value set by the base station. As an example, if the SSB ID is applied as an additional parameter, Equations 20 to 23 above may be modified as Equations 25 to 28. Synchronization signal block (SSB) may be called in other terms, such as SS/PBCH block.

$$c_{init} = n_{RNTI} \cdot 2^A + q \cdot 2^B + \left\lfloor \frac{n_s}{N_{slot}^{subframe,\mu}} \right\rfloor \cdot 2^C + N_{ID}^{cell} \cdot 2^D + I_{SSB} \quad \text{Equation 25}$$

$$c_{init} = \quad \text{Equation 26}$$
$$n_{RNTI} \cdot 2^A + q \cdot 2^B + \left( n_s \bmod N_{slot}^{subframe,\mu} \right) \cdot 2^C + N_{ID}^{cell} \cdot 2^D + I_{SSB}$$

$$c_{init} = n_{RNTI} \cdot 2^A + q \cdot 2^B + \quad \text{Equation 27}$$
$$(\{n_s \cdot N_{ID}^{cell}\} \bmod N_{slot}^{subframe,\mu}) \cdot 2^C + N_{ID}^{cell} \cdot 2^D + I_{SSB}$$

$$c_{init} = n_{RNTI} \cdot 2^A + q \cdot 2^B + \quad \overline{\text{Equation 28}}$$
$$(\{n_s \cdot [2N_{ID}^{cell}+1]\} \bmod N_{slot}^{subframe,\mu}) \cdot 2^C + N_{ID}^{cell} \cdot 2^D + I_{SSB}$$

In Equations 20 to 23, I_SSB may be configured of six bits including all of 1) 0 to 63 of available SSB index or may be configured of 3 LSBs of SS/PBCH block index alone which are transferred by 2) some of them, i.e., PBCH DMRS. At this time, according to the context, the A, B, C, and D values may be properly calculated.

Second Embodiment

In this embodiment, a method of initialization for generating a CSI-RS sequence is described. One major usage of CSI-RS is to measure the UE's mobility. In this case, the UE measures CSI-RSs transmitted from the neighbor cells as well as from its serving cell. If the CSI-RS sequence is initialized based on $n_s$ not repeated within one frame, the UE may be unaware of the exact value of the CSI-RS sequence until the PBCH of the neighbor cell is decoded. However, if the CSI-RS sequence is repeated every 5 ms, i.e., in half frame units, the UE may be exactly aware of the CSI-RS sequence only by receiving the PBCH DMRS transmitting three LSBs of SS/PBCH block index, which advantageously eliminates the need for decoding the PBCH of the neighbor cell.

To that end, the following sequence generation and initialization may be used.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{Equation 29}$$

$$m = 0, 1, \ldots, M \cdot N_{RB}^{max,DL} - 1$$

In Equation 29, M may be 1) the number of CSI-RS ports included in one CSI-RS CDM group or 2) the number of CSI-RS ports included in one CSI-RS resource. In the case of 1), M may be configured up to eight by higher layer and, in the case of 2), M may be configured up to 32 by higher layer. This is intended for generating a long gold sequence output in one CDM group or CSI-RS resource and properly sharing it per port.

$$c_{init}=2^A \cdot (\{14 \cdot (n_s+1)+l+1\} \bmod \{N_{slot}^{frame,\mu}/2\}) \cdot (2 \cdot N_{ID}^{CSI}+1)+2^B \cdot N_{ID}^{CSI}+N_{CP} \quad \text{Equation 30}$$

In Equation 30, N_CP may be omitted and, depending on whether N_CP is omitted, B=1 1) if N_CP is present, and B=0 if N_CP is absent. Likewise, 1) if N_CP is present, A=11 and, if N_CP is absent, A=10.

Meanwhile, similar to the data scrambling example of embodiment 1, even in the case of Equation 30, as the number of CSI-RS IDs increases, and the number of slots in one frame increases according to numerology, the length of LFSR-31 gold sequence may be exceeded. Thus, for sequence initialization, the following time domain scaling may be taken into account.

$$c_{init}=2^A \cdot (\{14 \cdot \lfloor n_s/N_{slot}^{subframe,\mu} \rfloor+1)+l+1\} \bmod \{N_{slot}^{frame,\mu}/2\}) \cdot (2 \cdot N_{ID}^{CSI}+1)+2^B \cdot N_{ID}^{CSI}+N_{CP} \quad \text{Equation 31}$$

$$c_{init}=2^A \cdot (\{14 \cdot (n_s \bmod N_{slot}^{subframe,\mu}+1)+l+1\} \bmod \{N_{slot}^{frame,\mu}/2\}) \cdot (2 \cdot N_{ID}^{CSI}+1)+2^B \cdot N_{ID}^{CSI}+N_{CP} \quad \text{Equation 32}$$

$$c_{init}=2^A \cdot (14 \cdot (\lfloor n_s/N_{slot}^{subframe,\mu} \rfloor+1)+l+1) \cdot (2 \cdot N_{ID}^{CSI}+1)+2^B \cdot N_{ID}^{CSI}+N_{CP} \quad \text{Equation 33}$$

$$c_{init}=2^A \cdot (14 \cdot (n_s \bmod N_{slot}^{subframe,\mu}+1)+l+1) \cdot (2 \cdot N_{ID}^{CSI}+1)+2^B \cdot N_{ID}^{CSI}+N_{CP} \quad \text{Equation 34}$$

In Equations 31 to 34, N_CP may be omitted and, depending on whether N_CP is omitted, B=1 1) if N_CP is present, and B=0 if N_CP is absent. Likewise, 1) if N_CP is present, A=11 and, if N_CP is absent, A=10.

Equations 31 to 34 regard a method of performing initialization by the CSI-RS timing information n_s and a non-linear function between 1 and cell $N_{ID}^{CSI}$. If initialization is performed by the CSI-RS timing information n_s and the linear function between 1 and cell ID $N_{ID}^{CSI}$, the following options may be considered.

$$c_{init}=2^A \cdot (\{14 \cdot (\lfloor n_s/N_{slot}^{subframe,\mu} \rfloor+1)+l+1\} \bmod \{N_{slot}^{frame,\mu}/2\})+2^B \cdot N_{ID}^{CSI}+N_{CP} \quad \text{Equation 35}$$

$$c_{init}=2^A \cdot (\{14 \cdot (n_s \bmod N_{slot}^{subframe,\mu}+1)+l+1\} \bmod \{N_{slot}^{frame,\mu}/2\})+2^B \cdot N_{ID}^{CSI}+N_{CP} \quad \text{Equation 36}$$

In Equations 35 and 36, N_CP may be omitted and, depending on whether N_CP is omitted, B=1 1) if N_CP is present, and B=0 if N_CP is absent. Likewise, 1) if N_CP is present, A=11 and, if N_CP is absent, A=10.

In the second example of CSI-RS sequence generation, based on additional parameter(s) other than n_s, l, and $N_{ID}^{CSI}$, $c_{init}$ is defined. The additional parameters may be configured by high layer signaling, and specific contents may be SSB ID (I_SSB), or bandwidth part ID (BWP_ID), or carrier ID (C_ID), or a random value set by the base station. As an example, if the SSB ID is applied as an additional parameter, Equations 31 and 32 above may be modified as Equations 33 and 34. The SSB may be called in other terms, such as SS/PBCH block.

$$c_{init}=2^A \cdot (\{14 \cdot (\lfloor n_s/N_{slot}^{subframe,\mu} \rfloor+1)+l+1\} \bmod \{N_{slot}^{frame,\mu}/2\})+2^B \cdot N_{ID}^{CSI}+N_{CP} \quad \text{Equation 37}$$

$$c_{init}=2^A \cdot (\{14 \cdot (n_s/N_{slot}^{subframe,\mu}+1)+l+1\} \bmod \{N_{slot}^{frame,\mu}/2\})+2^B \cdot N_{ID}^{CSI}+I_{SSB} \quad \text{Equation 38}$$

In Equations 37 and 38, N_CP has been omitted for ease of description. In Equations 37 and 38, I_SSB may be configured of six bits including all of 1) 0 to 63 of available SSB index or may be configured of 3 LSBs of SS/PBCH block index alone which are transferred by 2) some of them, i.e., PBCH DMRS. At this time, according to the context, the A, B, C, and D values may be properly calculated.

Third Embodiment

In a third embodiment, a method is proposed for effectively operating the increased DMRS sequence length upon generating a DMRS sequence in the NR system. As set forth above, when, based on the PN sequence C(n), the DMRS sequence r(m) is generated, the length of sequence generated as expressed in the following equation may be determined by the number A of DMRS REs in the PRB and the maximum number $N_{RB}^{max}$ of RBs supported for DL or UL in the NR system.

$$r(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, AN_{RB}^{max} - 1$$

However, the NR system may support various DMRS structures and a need exists for a method for effectively generating a DMRS sequence and mapping it to a resource considering various DMRS structures. Further, the NR system supports various numerologies and considers a channel bandwidth up to 400 MHz. When the supported subcarrier spacing up to 15/30/60/120/240/480 kHz and the channel bandwidth up to 5/10/40/80/100/200/400 MHz are considered, the maximum number of subcarriers and the number of PRBs are shown in Tables 5 and 6, respectively.

TABLE 5

| SCS (kHz) | Channel bandwidth (MHz) | | | | | | |
|---|---|---|---|---|---|---|---|
| | 5 | 10 | 40 | 80 | 100 | 200 | 400 |
| 15 | 330 | 660 | 2640 | 5280 | 6600 | 13200 | 26400 |
| 30 | 165 | 330 | 1320 | 2640 | 3300 | 6600 | 13200 |
| 60 | 82.5 | 165 | 660 | 1320 | 1650 | 3300 | 6600 |
| 120 | 41.25 | 82.5 | 330 | 660 | 825 | 1650 | 3300 |
| 240 | 20.625 | 41.25 | 165 | 330 | 412.5 | 825 | 1650 |
| 480 | 10.3125 | 20.625 | 82.5 | 165 | 206.25 | 412.5 | 825 |

Max number of subcarriers (w/99% SE)(assuming max 6600 SCs),

TABLE 6

| SCS (kHz) | RB size | Channel bandwidth (MHz) | | | | | | |
|---|---|---|---|---|---|---|---|---|
| | | 5 | 10 | 40 | 80 | 100 | 200 | 400 |
| 15 | 180 kHz | 27.5 | 55 | 220 | 440 | 550 | 1100 | 2200 |
| 30 | 360 kHz | 13.75 | 27.5 | 110 | 220 | 275 | 550 | 1100 |
| 60 | 720 kHz | 6.875 | 13.75 | 55 | 110 | 137.5 | 275 | 550 |
| 120 | 1.44 MHz | 3.4375 | 6.875 | 27.5 | 55 | 68.75 | 137.5 | 275 |
| 240 | 2.88 MHz | 1.71875 | 3.4375 | 13.75 | 27.5 | 34.375 | 68.75 | 137.5 |
| 480 | 5.76 MHz | 0.859375 | 1.71875 | 6.875 | 13.75 | 17.1875 | 34.375 | 68.75 |

Max number of PRBs (w/99% SE)(assuming max 6600 SCs)

The number of subcarriers and the number of RBs proposed in Tables 5 and 6 above are merely an example and other values may be used as NR standardization proceeds. According to Table 6, the maximum number of RBs supported in the NR system differs depending on the subcarrier spacings and channel bandwidths supported, and if the number of subcarriers supported is 6,600, the maximum number of RBs may rise up to 550. In contrast, even when the same channel bandwidth is used, if the subcarrier spacing increases, the maximum number of RBs supported decreases. Thus, a need exists for a method capable of effectively operating the DMRS sequence length depending on various numbers of RBs supported.

A first method is to determine the number A of DMRS REs in the PRB in Equation 40 above. Specifically, given that the NR system supports various DMRS structures, the following approaches may be considered as methods for effectively generating a DMRS sequence.

Alt-1: A is determined to be the number of DMRS REs in the highest-RE density DMRS pattern including other DMRS patterns among various DMRS structures.

Alt-2: A is determined to be the number of DMRS REs of the Front-loaded DMRS pattern among various DMRS structures.

Figure 6B:
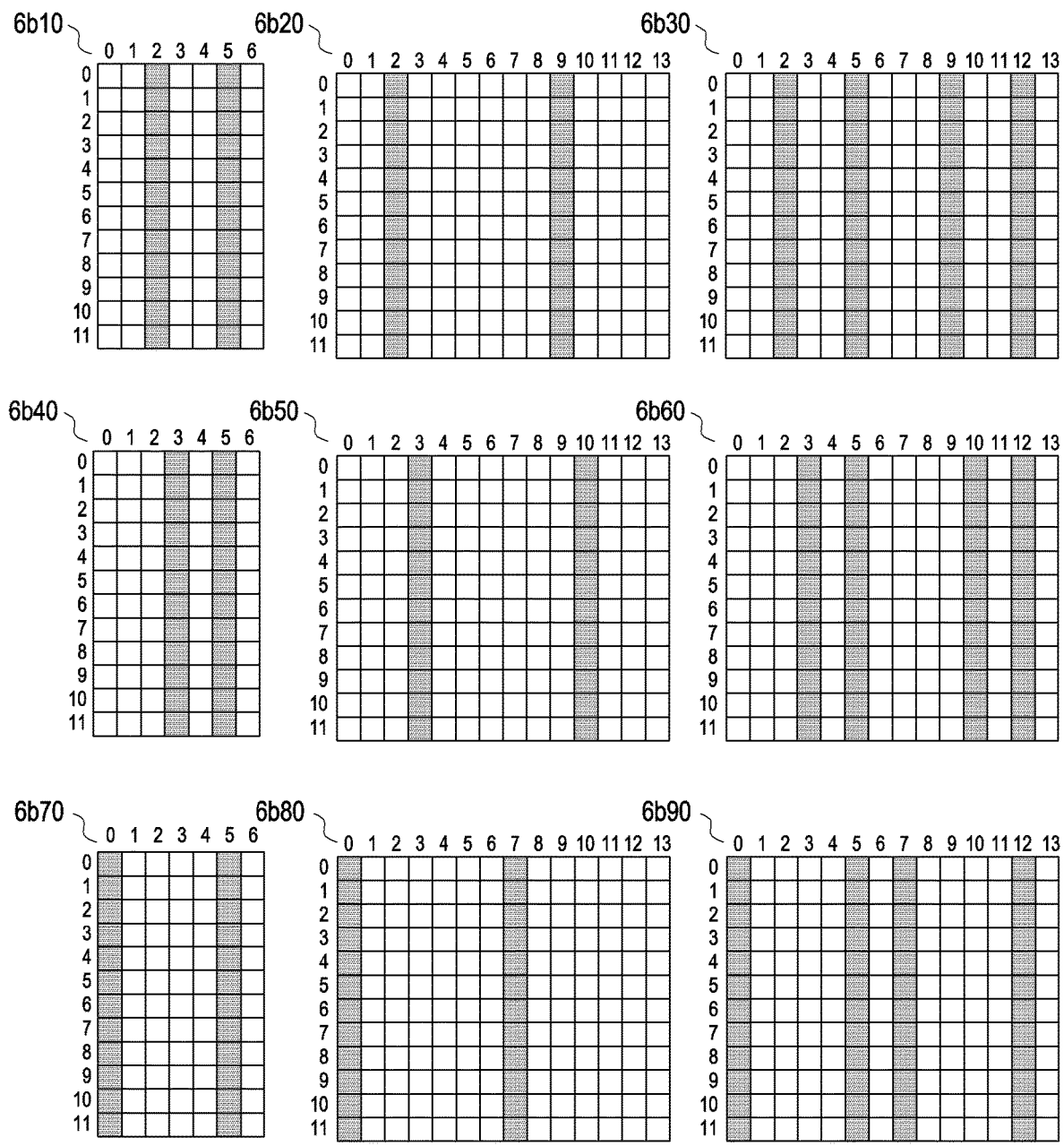
Figure 6C:
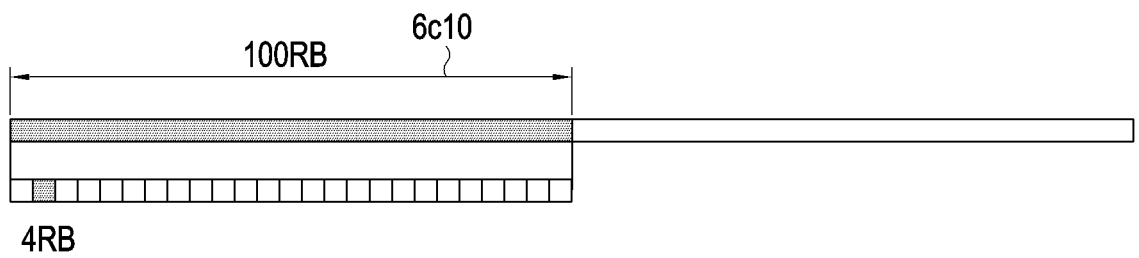
Figure 6D:
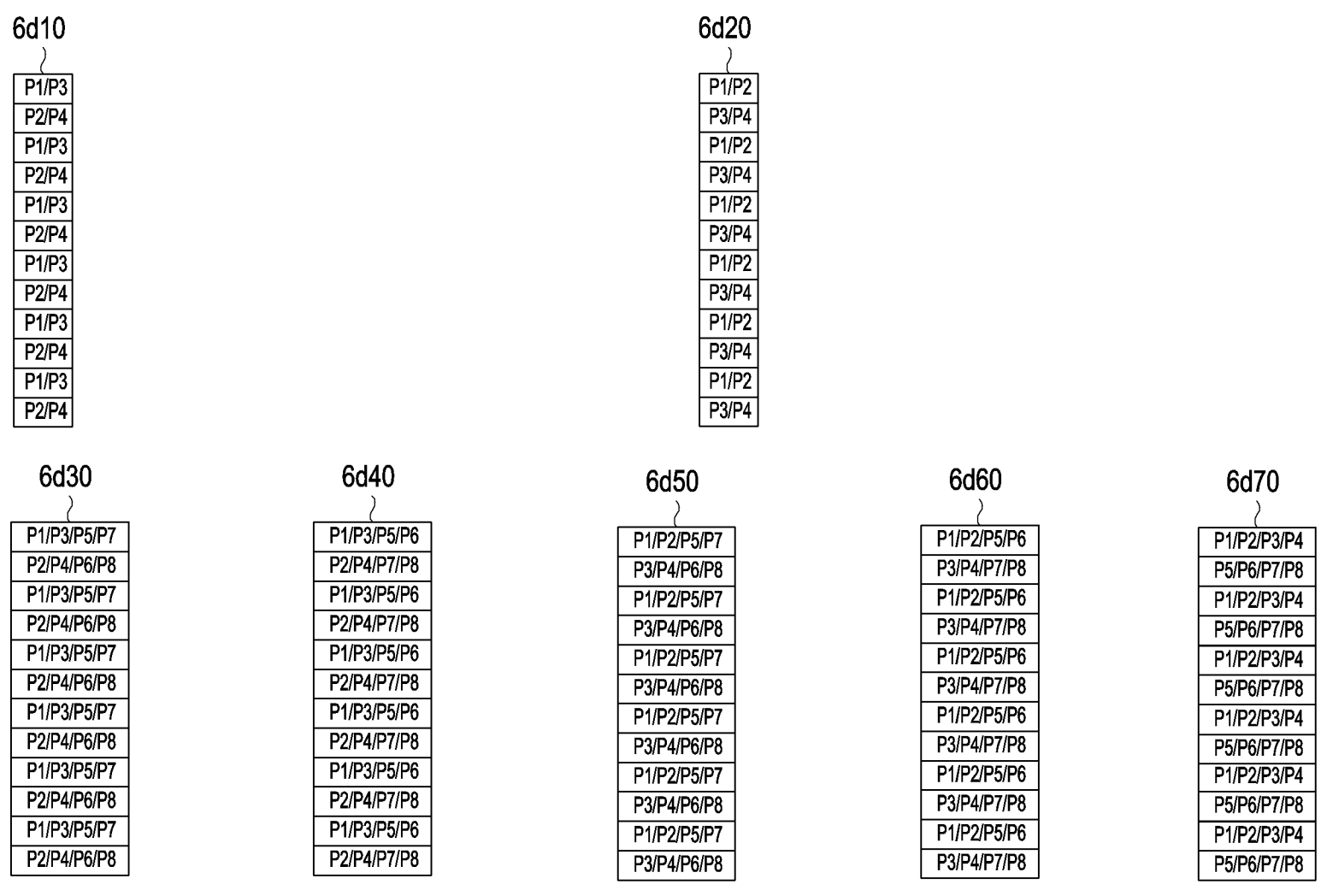
Figure 6E:
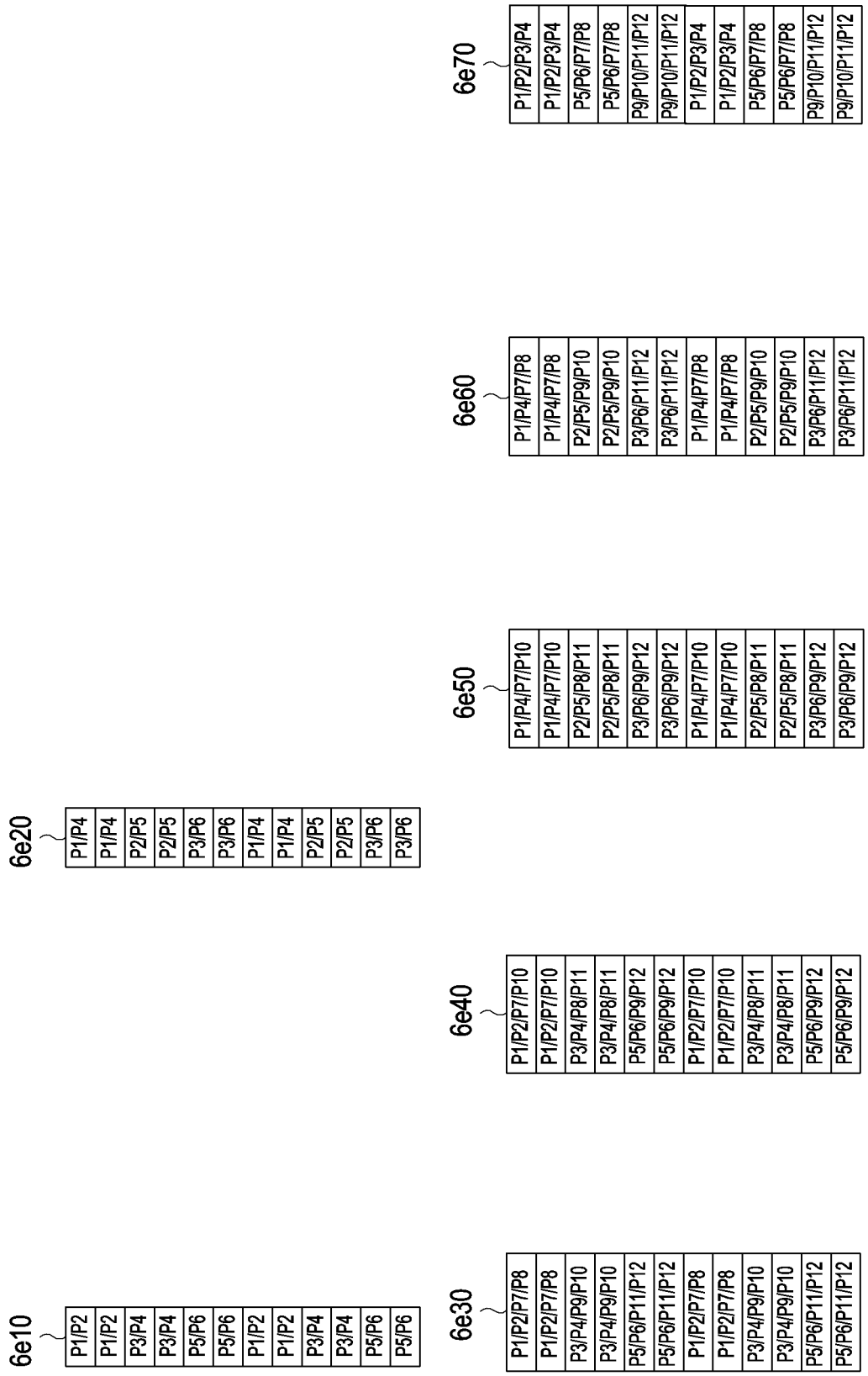

In Alt-1, A is determined to be the number of DMRS REs in the DMRS pattern with the highest RE density including other DMRS patterns among various DMRS structures, a DMRS sequence is generated, and for DMRS patterns with a lower RE density, only part of the sequence is used. More specifically, referring to FIGS. 6A and 6B, based on 6a10, 6b10, 6b20, and 6b30, in the case of Alt-1, a DMRS sequence is generated based on the DMRS pattern with the highest RE density as in 6b30. If DMRS patterns with a lower RE density are used as in 6a10, 6b10, and 6b20, only some of the pre-created patterns may be mapped to resources. Unlike this, in Alt-2, A is determined to be the number of DMRS REs in the Front-loaded DMRS pattern among various DMRS structures, a DMRS sequence is generated, and for DMRS patterns with a higher RE density, the generated sequence is reused for extension. More specifically, referring to FIGS. 6A and 6B, based on 6a10, 6b10, 6b20, and 6b30, in the case of Alt-2, a DMRS sequence is generated based on the most Front-loaded DMRS pattern as in 6a30. If a DMRS pattern with a higher RE density as in 6b10, 6b20, or 6b30 is used, the sequence for the Front-loaded DMRS pattern pre-created may be repeatedly mapped to resources for additional DMRSs. In the case of Alt-2, as shown in FIG. 6E, if all the Unit DMRS patterns with different densities on the frequency are supported, Alt-2 may generate a sequence based on the Unit DMRS pattern with a higher density among them. More specifically, if 6e10 and 6e20 both are supported, Alt-2 generates a sequence based on 6e20 and, if a Unit DMRS pattern with a lower density as in 6e10 is configured, part of the generated sequence is punctured and the rest alone may be mapped to the resource. As compared with Alt-1, Alt-2 may advantageously be operated with a shorter DMRS sequence.

Described next is a method for determining the maximum number $N_{RB}^{max}$ of RBs supported for DL or UL in Equation 39 above. As set forth above, the maximum number of RBs supported in the NR system differs depending on the subcarrier spacings and channel bandwidths supported, and the maximum number of RBs supported may be significantly increased as compared with the LTE system. Thus, a need exists for a method capable of effectively operating the DMRS sequence length depending on various numbers of RBs supported. At this time, the following approaches may be considered as methods for determining the DMRS sequence length.

Alt-1: $N_{RB}^{max}$ is configured considering the maximum bandwidth supported in the currently configured subcarrier spacing.

Alt-2: $N_{RB}^{max}$ is configured considering all the subcarrier spacings defined in NR and the maximum bandwidths supported.

Alt-1 above is configured considering the maximum bandwidth supported in the currently configured subcarrier spacing. More specifically, if the currently configured subcarrier spacing in Table 6 is 15 kHz, the number of RBs may be 550 considering the maximum bandwidth supported, 100 MHz. If the currently configured subcarrier spacing is 15 kHz, the number of RBs may be 220 considering the maximum bandwidth supported, 40 MHz. In contrast, since Alt-2 is a method configured considering the maximum bandwidth supported in all the subcarrier spacings defined in NR, 550 which is the largest number of RBs based on Table 6 may be set as $N_{RB}^{max}$. Further, in the case of Alt-2, all supported subcarrier spacings may be considered separately for <6 Hz and >6 GHz so as to minimize the length of DMRS sequence to be generated. Specifically, the subcarrier spacings supported in the case of <6 GHz are limited to 15/30/60 kHz and, the largest number of RBs in Table 6, i.e., 550, may be set as $N_{RB}^{max}$. However, the subcarrier spacings supported in the case of 6 GHz are limited to 120/240/480 kHz and, the largest number of RBs in Table 6, i.e., 275, may be set as $N_{RB}^{max}$. As another method, Alt-2 considers only subcarrier spacings and channel bandwidths supported by the base station, and may be determined from the set. For example, if the subcarrier spacings supported by the base station are limited to 15/30/60 kHz, and the channel bandwidths supported are limited to 5/10/40 MHz, the largest RB count, 220, in this set, in terms of Table 4, may be set as $N_{RB}^{max}$. However, when the above approaches are considered, the length of the DMRS sequence to be generated may still be very large as compared with current LTE. Thus, the following may be taken into consideration to address such issues. The method proposed below utilizes two-step resource allocation. To prevent an increase in RBG size due to an increase in channel bandwidth, two-step resource allocation may be put to use. Specifically, when a system bandwidth up to 500RBs, as an example, is allocated as shown in FIG. 2J, the two-step resource allocation method for maintaining the RBG size as 4 sets a resource allocation position of 100RBs among the 500RBs using a 5-bit bitmap first in the first step as in 6c10 of FIG. 6C. In the next, second step, an allocation position of 4RBs among the 100RBs may be set using a 25-bit bitmap. Thus, rather than determining $N_{RB}^{max}$ based on the maximum bandwidth currently allocated, the above-described two-step resource allocation may be applied. More specifically, if a system bandwidth up to 500RBs is allocated in 6c10, $N_{RB}^{max}$ is not 500 but the 100RBs determined in the first step of two-step resource allocation may be determined as $N_{RB}^{max}$. The method of determining $N_{RB}^{max}$ using two-step resource allocation may apply to both Alt-1 and Alt-2.

Fourth Embodiment

In a fourth embodiment, a method of TRP-specifically generating and initializing a DMRS sequence in the NR system is described. Upon generating a DMRS sequence TRP-specifically, a DMRS sequence is generated using the TRP ID, so that each TRP has a different DMRS sequence. Here, transmission reception point (TRP) may be used as the concept 'Cell,' and TRP ID may denote the Cell ID. In all the embodiments of the disclosure, the terms TRP and Cell may be interchangeably used. The TRP-specific generation of DMRS sequence advantageously allows the cross-correlation of DMRS sequence between different TRPs to be randomized as maximum as possible. In contrast, to effectively remove interference signals from other TRPs, the UE is required to receive signaling of DMRS information about other TRPs, like other TRP ID. Proposed herein are specific methods for TRP-specifically generating and initializing a DMRS sequence. More specifically, the fourth embodiment proposes a method of initializing the DMRS sequence with Cell-ID and slot number and Scrambling ID. The first method may be represented as in Equation 40.

$$c_{init}=2^{X+Y}(n_s+1)+2^{X}n_{ID}^{(nSCID)}+n_{SCID} \quad \text{Equation 40}$$

In Equation 40, $n_s$ denotes the slot number in the transmission frame, $n_{SCID}$ denotes the Scrambling ID, and unless mentioned specifically, Scrambling ID is assumed to be 0. In the NR system, $n_{SCID}$ may have two or more values. $n_{SCID}$ is the number of cases, N, may be set to two values, 0 or 1, considering the DMRS sequence scrambling between the two TRPs in COMP operation like in the LTE system, and the NR system may have two or more values, i=0, 1, ..., N, considering various operation environments. For example, N=4. Further, X is the bit count differentiated by $n_{SCID}$ and may be determined by X=log 2(N). Further, $n_{ID}^{(i)}$, i=0, 1, ..., N may be determined as follows.

$n_{ID}^{(i)}=N_{ID}^{cell}$ if no value for $n_{ID}^{DMRS,i}$ is provided by higher layers or if DCI format which does not support $n_{SCID}$ values is used for the DCI associated with the PDSCH transmission $n_{ID}^{(i)}=n_{ID}^{DMRS,i}$ otherwise, In the above, the value of $n_{ID}^{DMRS,i}$ may be set by a similar method as that shown in Table 5 below by a higher layer. In Table 5, N_cellID denotes the number of cell IDs. The LTE system has 504 Cell IDs, but the NR system may have 1,000 Cell IDs. Table 7 shows an example in which $n_{SCID}$ is four, and the number may be reduced to 2 or may be increased depending on consideration of the NR system. In Equation 7-1, Y is the bit number differentiating Cell IDs, and if the number of Cell IDs is 1,000, Y=10.

TABLE 7

```
-- ASN1START
DMRS-Config ::=    CHOICE {
  release                    NULL,
  setup                      SEQUENCE (
    scramblingIdentity       INTEGER (0 .. N cellID-1),
    scramblingIdentity2      INTEGER (0 .. N cellID-1),
    scramblingIdentity3      INTEGER (0 .. N cellID-1),
    scramblingIdentity4      INTEGER (0 .. N cellID-1)
}
```

In Equation 40, the DMRS sequence is initialized every slot. However, as the NR system has increased subcarrier spacing, the slot length may be significantly shortened. More specifically, Table 8 below shows the slot length depending on the subcarrier spacing (SCS).

TABLE 8

| | OFDM symbol number within slot | |
|---|---|---|
| SCS (kHz) | 7 | 14 |
| 15 | 0.5 ms | 1 ms |
| 30 | 0.25 ms | 0.5 ms |
| 60 | 0.125 ms | 0.25 ms |
| 120 | — | 0.125 ms |
| 240 | — | 0.0625 ms |
| 480 | — | 0.03125 ms |

Slot Length Depending on Subcarrier Spacing (SCS)

As shown in Table 8, as the subcarrier spacing increases, the slot length shortens. Thus, initializing the DMRS sequence every slot may overburden implementation. Thus, to address this issue, the following modified equation is proposed.

$$c_{init}=2^{X+Y}(\lfloor n_s/M \rfloor+1)+2^{X}n_{ID}^{(nSCID)}+n_{SCID} \quad \text{Equation 41}$$

In Equation 41, the same description given for Equation 40 applies to all other parameters than M. In Equation 41, M is a parameter for adjusting the initialization of the DMRS sequence depending on the slot length. M may be shown in Table 9 below when the DMRS sequence is initialized based on a slot length of 1 ms. It is noted that the method of differently initializing the DMRS sequence depending on the slot length as expressed in Equation 41 may be expressed in a different manner. For example, as Equation 40 is used, the following phrase may be used.

UE is not expected to update $c_{init}$ less than Xmsec.

Here, X may be 1 msec.

TABLE 9

| | OFDM symbol number within slot | |
|---|---|---|
| SCS (kHz) | 7 | 14 |
| 15 | 2 | 1 |
| 30 | 4 | 2 |
| 60 | 8 | 4 |
| 120 | — | 8 |
| 240 | — | 16 |
| 480 | — | 32 |

Example of M value for maintaining DMRS sequence initialization over slot length of 1 ms, Another method for TRP-specifically generating and initializing the DMRS sequence may be expressed as in the following equation. The following method may further randomize the cross-relation of DMRS sequence between different TRPs than the methods of Equations 40 and 41. Specifically, it is assumed that $\overline{Y_1}$ and $\overline{Y_2}$, respectively, are PN sequences generated using $X_1$=first cell ID and $X_2$=second cell ID, as initialization values and that $\overline{Y_1'}$ and $\overline{Y_2'}$ are PN sequences generated using $X_1+Z$ and $X_2+Z$, respectively, as initialization values. Z is assumed to be the slot number. In this case, under the assumption of time synchronized network, the property of cross-correlation between $\overline{Y_1'}$ and $\overline{Y_2'}$ is the same as the property of cross-correlation between $\overline{Y_1}$ and $\overline{Y_2}$. This means that if $\overline{Y_1}$ and $\overline{Y_2}$ have a bad correlation, $\overline{Y_1'}$ and $\overline{Y_2'}$ also have a bad correlation. Thus, to address this issue, the following modified equation is proposed.

$$c_{init}=2^{X+Y}(n_s+1)\cdot(2n_{ID}^{(nSCID)}+1)+2^X n_{ID}^{(nSCID)}+n_{SCID} \quad \text{Equation 42}$$

In Equation 42, the same description given for Equation 40 applies to all other parameters than $(2n_{ID}^{(nSCID)}+1)$. In Equation 42, $(2n_{ID}^{(nSCID)}+1)$ may be replaced with $(n_{ID}^{(nSCID)}+1)$. The reason why $(2n_{ID}^{(nSCID)}+1)$ is used in Equation 42 is that use of $(2n_{ID}^{(nSCID)}+1)$, rather than $(n_{ID}^{(nSCID)}+1)$, may lead to further randomization of cross-correlation of DMRS sequence between different TRPs. More specifically, it is considered that when M1 and M2 are assumed to be different Cell IDs, M2+1=2(M1+1). For example, this corresponds to the case of (0,1), (1,3), (2,5), (3,7), . . . . If sequence initialization is performed using $(n_{ID}^{(nSCID)}+1)$, the cross-correlation between I component corresponding to Cell-ID M1 in Equation 39 and Q component corresponding to Cell-ID M2 is not varied depending on the slot number. In such a case, use of $(2n_{ID}^{(nSCID)}+1)$ may address the foregoing issues. In Equation 8-1, the DMRS sequence is initialized every slot. However, as the NR system has increased subcarrier spacing, the slot length may be significantly shortened. As shown in Table 6, as the subcarrier spacing increases, the slot length shortens. Thus, initializing the DMRS sequence every slot may overburden implementation. Thus, to address this issue, the following modified Equation 43 is proposed.

$$c_{init}=2^{X+Y}(\lfloor n_s/M\rfloor+1)\cdot(2n_{ID}^{(nSCID)}+1)+2^X n_{ID}^{(nSCID)}+n_{SCID} \quad \text{Equation 43}$$

In Equation 43, the same description given for Equation 42 applies to all other parameters than M. In Equation 43, M is a parameter for adjusting the initialization of the DMRS sequence depending on the slot length. M may be shown in Table 9 below when the DMRS sequence is initialized based on a slot length of 1 ms. It is noted that the method of differently initializing the DMRS sequence depending on the slot length as expressed in Equation 43 may be expressed in a different manner. For example, as Equation 42 is used, the following phrase may be used.

US is not expected to update $c_{init}$ less than Xmsec.

Here, X may be 1 msec.

Another method for TRP-specifically generating and initializing the DMRS sequence may be expressed as in the following equation. The following method is a modification to Equations 42 and 43 and avoids use of $n_{ID}^{(nSCID)}$. To that end, Equation 44 below may be put to use.

$$c_{init}=2^X(n_s+1)\cdot(2n_{ID}^{(nSCID)}+1)+n_{SCID} \quad \text{Equation 44}$$

In Equation 44, the same description given for Equations 40 and 41 applies to all of the parameters. However, as the NR system has increased subcarrier spacing, the slot length may be significantly shortened. As shown in Table 8, as the subcarrier spacing increases, the slot length shortens. Thus, initializing the DMRS sequence every slot may overburden implementation. Thus, to address this issue, the following modified Equation 45 is proposed.

$$c_{init}=2^X(\lfloor n_s/M\rfloor+1)\cdot(2n_{ID}^{(nSCID)}+1)+n_{SCID} \quad \text{Equation 45}$$

In Equation 45, the same description given for Equation 44 applies to all other parameters than M. In Equation 45, M is a parameter for adjusting the initialization of the DMRS sequence depending on the slot length. M may be shown in Table 9 below when the DMRS sequence is initialized based on a slot length of 1 ms. It is noted that the method of differently initializing the DMRS sequence depending on the slot length as expressed in Equation 45 may be expressed in a different manner. For example, as Equation 44 is used, the following phrase may be used.

US is not expected to update $c_{init}$ less than Xmsec.

Here, X may be 1 msec.

Fifth Embodiment

In a fifth embodiment, a method of resource-specifically generating and initializing a DMRS sequence in the NR system is described. Upon generating a DMRS sequence resource-specifically, a DMRS sequence is generated without using the TRP ID unlike in the third embodiment, so that each TRP has the same DMRS sequence. However, the DMRS sequence differs in allocated resource regions. Thus, this method has the shortcoming of a rise in cross-correlation of DMRS sequence between different TRPs. However, to effectively remove interference signals from other TRPs, the UE advantageously does not need to receive signaling of some DMRS information about other TRP, like other TRP ID. Proposed herein are specific methods for resource-specifically generating and initializing a DMRS sequence. More specifically, the fifth embodiment proposes a method of initializing the DMRS sequence with slot number and Scrambling ID. The first method may be represented as in Equation 46.

$$c_{init}=2^X(n_s+1)+n_{SCID} \quad \text{Equation 46}$$

In Equation 46, $n_s$ denotes the slot number in the transmission frame, $n_{SCID}$ denotes the Scrambling ID, and unless mentioned specifically, Scrambling ID is assumed to be 0. In the NR system, $n_{SCID}$ may have two or more values. In $n_{SCID}$, the number of cases, N, may be set to two values, 0 or 1, considering the DMRS sequence scrambling between the two TRPs in COMP operation like in the LTE system, and the NR system may have two or more values, i=0, 1, . . . , N, considering various operation environments. For example, N=4. Further, X is the bit count differentiated by $n_{SCID}$ and may be determined by X=log 2(N). In Equation 46, the DMRS sequence is initialized every slot. However, as the NR system has increased subcarrier spacing, the slot length may be significantly shortened. As shown in Table 6, as the subcarrier spacing increases, the slot length shortens. Thus, initializing the DMRS sequence every slot may overburden implementation. Thus, to address this issue, the following modified Equation 47 is proposed.

$$c_{init}=2^X(\lfloor n_s/M\rfloor+1)+n_{SCID} \quad \text{Equation 47}$$

In Equation 47, the same description given for Equation 46 applies to all other parameters than M. In Equation 47, M is a parameter for adjusting the initialization of the DMRS sequence depending on the slot length. M may be shown in Table 9 below when the DMRS sequence is initialized based on a slot length of 1 ms. It is noted that the method of differently initializing the DMRS sequence depending on the slot length as expressed in Equation 45 may be expressed in a different manner. For example, as Equation 46 is used, the following phrase may be used.

US is not expected to update $c_{init}$ less than Xmsec.

Here, X may be 1 msec.

Another method for resource-specifically generating and initializing the DMRS sequence may be expressed as in the following equation. The following method may further randomize the cross-relation of DMRS sequence between different TRPs than the methods of Equations 46 and 47. Specifically, it is assumed that $\overline{Y_1}$ and $\overline{Y_2}$, respectively, are PN sequences generated using $X_1$=first cell ID and $X_2$=second cell ID, as initialization values and that $\overline{Y_1'}$ and $\overline{Y_2'}$ are PN sequences generated using $X_1+Z$ and $X_2+Z$, respectively, as initialization values. Z is assumed to be the slot number. In this case, under the assumption of time synchronized network, the property of cross-correlation between $\overline{Y_1'}$ and $\overline{Y_2'}$ is the same as the property of cross-correlation between $\overline{Y_1}$ and $\overline{Y_2}$. This means that if $\overline{Y_1}$ and $\overline{Y_2}$ have a bad correlation, $\overline{Y_1}$ and $\overline{Y_2}$ also have a bad correlation. Thus, to address this issue, the following modified Equation 48 is proposed.

$$c_{init}=2^X(n_s+1)\cdot(2n_{SCID}+1)+n_{SCID} \quad \text{Equation 48}$$

In Equation 48, the same description given for Equation 46 applies to all other parameters than $(2n_{SCID}+1)$. In Equation 48, $(2n_{SCID}+1)$ may be replaced with $(n_{SCID}+1)$. The reason why $(2n_{SCID}+1)$ is used in Equation 48 is that use of $(2n_{SCID}+1)$, rather than $(n_{SCID}+1)$, may lead to further randomization of cross-correlation of DMRS sequence between different TRPs. More specifically, it is considered that when M1 and M2 are assumed to be different Scrambling IDs, M2+1=2(M1+1). For example, this corresponds to the case of (0,1), (1,3), (2,5), (3,7), . . . . If sequence initialization is performed using $(n_{SCID}+1)$, the cross-correlation between I component corresponding to Cell-ID M1 in Equation 6 and Q component corresponding to Cell-ID M2 is not varied depending on the slot number. In such a case, use of $(2n_{SCID}+1)$ may address the foregoing issues. In Equation 48, the DMRS sequence is initialized every slot. However, as the NR system has increased subcarrier spacing, the slot length may be significantly shortened. As shown in Table 8, as the subcarrier spacing increases, the slot length shortens. Thus, initializing the DMRS sequence every slot may overburden implementation. Thus, to address this issue, the following modified Equation 49 is proposed.

$$c_{init}=2^X(\lfloor n_s/M\rfloor+1)\cdot(2n_{SCID}+1)+n_{SCID} \quad \text{Equation 49}$$

In Equation 49, the same description given for Equation 48 applies to all other parameters than M. In Equation 49, M is a parameter for adjusting the initialization of the DMRS sequence depending on the slot length. M may be shown in Table 9 below when the DMRS sequence is initialized based on a slot length of 1 ms. It is noted that the method of differently initializing the DMRS sequence depending on the slot length as expressed in Equation 49 may be expressed in a different manner. For example, as Equation 48 is used, the following phrase may be used.

UE is not expected to update $c_{init}$ less than Xmsec.

Here, X may be 1 msec.

Fifth Embodiment

Similar to the first embodiment, in the fifth embodiment, a method of performing data scrambling in the NR system is proposed. Similar to LTE, NR may perform data scrambling using a PN sequence. In this case, the PN sequence may be generated based on various lengths of gold sequences, such as length-31 Gold sequence or length-63 Gold sequence. In the instant embodiment, $c_{init}$ configuration methods for initializing the sequence based on the length-31 gold sequence with an LFSR structure as expressed in Equation 1 are provided.

As an example, PDSCH scrambling needs 1) the capability of independent interference randomizing per RNTI kind, 2) the capability of independent interference randomizing per codeword upon transmission of one or more codewords, 3) the capability of independent interference randomizing per specific time unit, e.g., slot or OFDM symbol, and 4) the capability of independent interference randomizing per specific space unit, e.g., cell/beam/TRP.

Thus, in the first example for PDSCH scrambling, based on the four parameters $n_{RNTI}$, q, $n_s$, and $N_{ID}^{cell}$, $c_{init}$ is defined. At this time, $n_{RNTI}$ has a 16-bit payload, q has one-bit payload to differentiate up to two codewords, and $N_{ID}^{cell}$ has a 10-bit payload since it has values from 0 to 1007. Meanwhile, in the case of $n_s$, since the NR system supports numerologies as shown in Table 2, the number of slots in one frame constituted of 10 subframes with 1 ms duration is as shown in Table 3. In Table 3, $N_{slot}^{frame,\mu}$ is the number of slots included in one frame, i.e., 10 ms, and $N_{slot}^{frame,\mu}$ is the number of slots included in one subframe, i.e., 1 ms.

TABLE 10

| μ | Δf = $2^\mu$ ·15 [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Supported Transmission Numerologies

TABLE 11

| μ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Number of OFDM symbols per slot, $N_{symb}^{slot}$, for normal cyclic prefix

Table 11 means that when slot number $n_s$ is defined based on one frame like in LTE, the maximum value of $n_s$ may be varied depending on the numerology. Thus, the following two methods may be considered in applying the slot number or OFDM symbol number to $c_{init}$.

Assuming the possible maximum value, i.e., $N_{slot}^{frame,\mu}=320$, the payload of $n_s$ may be defined as 9 bits (i.e., $n_s\in\{0, 1, \ldots, N_{slot}^{frame,\mu}-1\}$). In this case, $c_{init}$ is defined as expressed in Equation 50.

$$c_{init}=n_{RNTI}2^{20}+q2^{19}+n_s\cdot2^{10}+n_{ID} \quad \text{Equation 50}$$

In Equation 50, $n_{ID}p$ is a value UE-specifically set by high layer signaling and, like the physical cell ID, may have a value from 0 to 1007. If the $n_{ID}$ value is not signaled to the UE by higher layer or, due to the RRC state change (RRC CONNECTED/RRC INACTIVE/RRC IDLE), the UE is unable to use the previous $n_{ID}$ value, the UE assumes $n_{ID}=N_{ID}^{Cell}$ (i.e., physical cell ID). Meanwhile, $c_{init}$ based on Equation 50 has a payload of a total of 36 bits and thus has a larger length than LFSR-31 Gold sequence. To adjust this, a modification as expressed in Equation 51 is needed.

$$c_{init}=n_{RNTI}\cdot 2^A+q\cdot 2^B+\lfloor n_s/N_{slot}^{frame,\mu}\rfloor\cdot 2^C+n_{ID} \qquad \text{Equation 51}$$

In this example, it should be noted that sequence initialization has been assumed to be performed at the start of each slot. Although in this example, it has been assumed that A=15, B=14, and C=10 considering the above-discussed payload of q, $n_s$, $n_{ID}$, upon actual application, the exact values may be modified depending on determination of the payload per parameter. For example, PUSCH scrambling uses only a single codeword. Thus, q is omitted, and the following modified Equation 52 may apply.

$$c_{init}=n_{RNTI}\cdot 2^A+\lfloor n_s/N_{slot}^{frame,\mu}\rfloor\cdot 2^C+n_{ID} \qquad \text{Equation 52}$$

Here, A=14, and C=10. Equation 52 may apply likewise when different scrambling is not used depending on codewords in the case of PDSCH scrambling, that is, when q is omitted.

Meanwhile, in Equation 51 or 52, when µ>1, adjacent slots use the same $c_{init}$. Thus, interference randomizing performance may be deteriorated. This is why if correlation with the interference sequence is high in one slot, the consecutive $N_{slot}^{frame,\mu}-1$ slots may be likewise influenced by the high correlation of interference. To avoid this, an additional modification as expressed in Equation 53 may be considered.

$$c_{init}=n_{RNTI}\cdot 2^A+q\cdot 2^B+(n_s \bmod N_{slot}^{frame,\mu})\cdot 2^C+n_{ID} \qquad \text{Equation 53}$$

In this example, it should be noted that sequence initialization has been assumed to be performed at the start of each slot. Although in this example, it has been assumed that A=15, B=14, and C=10 considering the above-discussed payload of q, $n_s$, $n_{ID}$, upon actual application, the exact values may be modified depending on determination of the payload per parameter. For example, PUSCH scrambling uses only a single codeword. Thus, q is omitted, and the following modified Equation 54 may apply.

$$c_{init}=n_{RNTI}\cdot 2^A+(n_s \bmod N_{slot}^{frame,\mu})\cdot 2^C+n_{ID} \qquad \text{Equation 54}$$

Here, A=14, and C=10. Equation 54 may apply likewise when different scrambling is not used depending on codewords in the case of PDSCH scrambling, that is, when q is omitted.

According to Equation 53 or 54, sequence initialization is applied differently, but it is repeated every $N_{slot}^{frame,\mu}$th slot. Thus, if the $N_{slot}^{frame,\mu}$ value is large, there may be a likelihood of occurrence of an issue due to the high correlation with the interference sequence as expressed in Equation 52.

$$c_{init}=n_{RNTI}\cdot 2^A+q\cdot 2^B+(\{n_s\cdot N_{ID}^{cell}\} \bmod N_{slot}^{frame,\mu})\cdot 2^C+n_{ID} \qquad \text{Equation 55}$$

In this example, it should be noted that sequence initialization has been assumed to be performed at the start of each slot. Although in this example, it has been assumed that A=15, B=14, and C=10 considering the above-discussed payload of q, $n_s$, $n_{ID}$, upon actual application, the exact values may be modified depending on determination of the payload per parameter. Equation 55 is a variation to Equation 54 and is an example of allowing each cell to use a different repetitive pattern by multiplying the slot number by the cell ID to address the issue with Equation 54 (the initialized value repeated every $N_{slot}^{frame,\mu}$th slot). The example in which q is omitted is similar to Equation 54 or 52 and is not described herein.

$$c_{init}=n_{RNTI}\cdot 2^A+q\cdot 2^B+(\{n_s\cdot[2n_{ID}+1]\} \bmod N_{slot}^{frame,\mu})\cdot 2^C+n_{ID} \qquad \text{Equation 56}$$

In this example, it should be noted that sequence initialization has been assumed to be performed at the start of each slot. Although in this example, it has been assumed that A=15, B=14, and C=10 considering the above-discussed payload of q, $n_s$, $n_{ID}$, and arrangement of the parameters, upon actual application, the exact values may be modified depending on determination of the payload per parameter and arrangement of parameters. Equation 56 is another variation to Equation 55 and is an example in which to address the issue with Equation 55 (the initialized value repeated every $N_{slot}^{frame,\mu}$th slot), the slot number is multiplied by $2n_{ID}+1$ to allow a different repetitive pattern to be used per UE.

In the examples from Equation 51 to Equation 56, the length $M_{bit}^{(q)}$ of the bit block targeted in performing the scrambling of Equation 3 was defined as the number of bits included in the codeword q transmitted in one slot on the channel (PDSCH, PDCCH, or PMCH). Meanwhile, as set forth above, in NR, slot or non-slot structures may be mixed and, in this case, different lengths of scrambling sequences negatively influence interference randomizing. To reduce performance deterioration due to uneven interference randomization, it may be agreed that $M_{bit}^{(q)}$ may be smaller than the number of bits included in codeword q transmitted in one slot. As an example, 1) the length $M_{bit}^{(q)}$ of the bit block for scrambling may be defined as the number of bits included in codeword q transmitted in one OFDM symbol, 2) the length $M_{bit}^{(q)}$ of the bit block for scrambling may be defined as the number of bits included in codeword q transmitted in one codeblock (CB), or 3) the length $M_{bit}^{(q)}$ of the bit block for scrambling may be defined as the number of bits included in codeword q transmitted in one codeblock group (CBG). If one example of 1), 2), and 3) is applied to Equations 51 to 56, the terms related to $n_s$ in Equations 51 to 56 are extended as follows.

$$\ldots +(L(n_s+1)+l+1)\cdot 2^C+\ldots \qquad \text{Equation 57}$$

In Equation 57, L may be agreed on as 1) the number of OFDM symbols, 2) the number of CBs, or 3) the number of CBGs in one slot according to the above examples, and l may also be agreed on as 1) OFDM symbol number, 2) CB number, or 3) CBG number according to the above examples.

The UE may receive the PDSCH to receive, e.g., RMSI, SIB, or paging, even before RRC configured by the base station. Similarly, the UE may transmit the PUSCH for message 3 (Msg3) even before RRC configured by the base station. In this case, since the UE has no RRC information configured by the base station, the UE needs to assume default values for some parameters in calculating $c_{init}$ of the examples. As an example, if the UE is not particularly assigned RNTI to be used for PDSCH or PUSCH scrambling by the base station, in the above examples, $n_{RNTI}$ may be agreed to be defined by C-RNTI.

In the second example for PDSCH scrambling, based on additional parameter(s) other than the above-described $n_{RNTI}$, q, $n_s$, and $n_{ID}$ (or $N_{ID}^{cell}$), $c_{init}$ is defined. The additional parameters may be configured by high layer signaling, and specific contents may be SSB ID (I_SSB), or bandwidth part ID (BWP_ID), or carrier ID (C_ID), or a random value set by the base station. As an example, if the SSB ID is applied as an additional parameter, Equations 51 to 56 above may be modified as Equations 58 to 61 below. The SSB may be called in other terms, such as SS/PBCH block.

$$c_{init} = n_{RNTI} \cdot 2^A + q \cdot 2^B + \left\lfloor \frac{n_s}{N_{slot}^{subframe,\mu}} \right\rfloor \cdot 2^C + n_{ID} \cdot 2^D + I_{SSB} \quad \text{Equation 58}$$

$$c_{init} = \quad \text{Equation 59}$$
$$n_{RNTI} \cdot 2^A + q \cdot 2^B + \left(n_s \bmod N_{slot}^{subframe,\mu}\right) \cdot 2^C + n_{ID} \cdot 2^D + I_{SSB}$$

$$c_{init} = n_{RNTI} \cdot 2^A + q \cdot 2^B + \quad \text{Equation 60}$$
$$\left(\{n_s \cdot n_{ID}\} \bmod N_{slot}^{subframe,\mu}\right) \cdot 2^C + n_{ID} \cdot 2^D + I_{SSB}$$

$$c_{init} = n_{RNTI} \cdot 2^A + q \cdot 2^B + \quad \text{Equtaion 61}$$
$$\left(\{n_s \cdot [2n_{ID}+1]\} \bmod N_{slot}^{subframe,\mu}\right) \cdot 2^C + n_{ID} \cdot 2^D + I_{SSB}$$

In Equations 58 to 61, I_SSB may be configured of six bits including all of 1) 0 to 63 of available SSB index or may be configured of 3 LSBs of SS/PBCH block index alone which are transferred by 2) some of them, i.e., PBCH DMRS. At this time, according to the context, the A, B, C, and D values may be properly calculated. A detailed description may be inferred from Equations 51 to 56 and is not given below. In Equations 58 to 61, q may be omitted depending on PUSCH and PDSCH transmission contexts as set forth above with reference to Equations 51 to 56 and, in such a case, A, C, and D are properly adjusted depending on the omission of q.

Sixth Embodiment

Similar to the first embodiment, in the sixth embodiment, a method of performing data scrambling in the NR system is proposed. Similar to LTE, NR may perform data scrambling using a PN sequence. In this case, the PN sequence may be generated based on various lengths of gold sequences, such as length-31 Gold sequence or length-63 Gold sequence. In the instant embodiment, $c_{init}$ configuration methods for initializing the sequence based on the length-31 gold sequence with an LFSR structure as expressed in Equation 1 are provided.

As an example, PDSCH scrambling needs 1) the capability of independent interference randomizing per RNTI kind, 2) the capability of independent interference randomizing per codeword upon transmission of one or more codewords, 3) the capability of independent interference randomizing per specific time unit, e.g., slot or OFDM symbol, and 4) the capability of independent interference randomizing per specific space unit, e.g., cell/beam/TRP.

Thus, in the first example for PDSCH scrambling, based on the four parameters $n_{RNTI}$, q, $n_s$, $N_{ID}^{cell}$, $c_{init}$ is defined. At this time, $n_{RNTI}$ has a 16-bit payload, q has one-bit payload to differentiate up to two codewords, and $N_{ID}^{cell}$ has a 10-bit payload since it has values from 0 to 1007. Meanwhile, in the case of $n_s$, since the NR system supports numerologies as shown in Table 12, the number of slots in one frame constituted of 10 subframes with 1 ms duration is as shown in Table 13. In Table 13, $N_{slot}^{frame,\mu}$ is the number of slots included in one frame, i.e., 10 ms, and $N_{slot}^{subframe,\mu}$ is the number of slots included in one subframe, i.e., 1 ms.

TABLE 12

| μ | Δf = $2^\mu$ ·15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Supported Transmission Numerologies

TABLE 13

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Number of OFDM symbols per slot, $N_{symb}^{slot}$, for normal cyclic prefix

Table 13 means that when slot number $n_s$ is defined based on one frame like in LTE, the maximum value of $n_s$ may be varied depending on the numerology. Thus, the following two methods may be considered in applying the slot number or OFDM symbol number to $c_{init}$.

Assuming the possible maximum value, i.e., $N_{slot}^{frame,\mu}=320$, the payload of $n_s$ may be defined as 9 bits (i.e., $n_s \in \{0, 1, \ldots, N_{slot}^{frame,\mu}-1\}$). In this case, t is defined as expressed in Equation 62.

$$c_{init} = n_{ID} 2^{20} + q 2^{19} + n_s \cdot 2^{10} + N_{ID}^{cell} \quad \text{Equation 62}$$

In Equation 62, $n_{ID}$ is a value UE-specifically set by high layer signaling and, like RNTI, may have a value from 0 to 2^(16-1). Equation 62, as compared with Equation 50, replaces the physical cell ID ($N_{ID}^{cell}$) with the RNTI-related portion ($n_{RNTI}$) by high layer signaling, ensuring a larger freedom than Equation 50. When Equation 62 is used, if the $n_{ID}$ value is not signaled to the UE by higher layer or, due to the RRC state change (RRC CONNECTED/RRC INACTIVE/RRC IDLE), the UE is unable to use the previous $n_{ID}$ value, the UE assumes $n_{ID}=n_{RNTI}$ (i.e., the RNTI applied to the PDSCH transmission). Equation 62 assumes use of the physical cell ID. If the physical cell ID is omitted, the following modifications are possible.

$$c_{init} = N_{ID} 2^A + q 2^B + n_s \quad \text{Equation 63}$$

In Equation 63, A=10 and B=9 under the above assumptions. However, in practice, A and B may be properly changed depending on whether q applies. When Equation 63 is used, if the $n_{ID}$ value is not signaled to the UE by higher layer or, due to the RRC state change (RRC CONNECTED/ RRC INACTIVE/RRC IDLE), the UE is unable to use the previous $n_{ID}$ value, the UE may assume 1) $n_{ID}=n_{RNTI}$ (i.e., the RNTI applied to the PDSCH transmission) or 2) $n_{ID}=N_{ID}^{cell}$ (i.e., physical cell ID). If 2) $n_{ID}=N_{ID}^{cell}$ (i.e., physical cell ID) is assumed, among the 16 bits of $n_{ID}$ the remaining LSB or MSB bits are filled with predetermined, specific values such as 0, . . . , 0.

Meanwhile, $c_{init}$ based on Equation 62 has a payload of a total of 36 bits and thus has a larger length than LFSR-31 Gold sequence. To adjust this, a modification as expressed in Equation 64 is needed.

$$c_{init} = n_{ID} \cdot 2^A + q \cdot 2^B + \lfloor n_s/N_{slot}^{subframe,\mu} \rfloor \cdot 2^C + N_{ID}^{cell} \quad \text{Equation 64}$$

In this example, it should be noted that sequence initialization has been assumed to be performed at the start of each slot. Although in this example, it has been assumed that A=15, B=14, and C=10 considering the above-discussed payload of q, $n_s$, $n_{ID}$, upon actual application, the exact values may be modified depending on determination of the payload per parameter. For example, PUSCH scrambling uses only a single codeword. Thus, q is omitted, and the following modified Equation 52 may apply.

$$c_{init}=n_{ID} \cdot 2^A + \lfloor n_s/N_{slot}^{subframe,\mu} \rfloor \cdot 2^C + N_{ID}^{cell} \quad \text{Equation 65}$$

Here, A=14, and C=10. Equation 65 may apply likewise when different scrambling is not used depending on codewords in the case of PDSCH scrambling, that is, when q is omitted. In Equations 64 and 65, $n_{ID}$ is a value UE-specifically set by high layer signaling and, like the physical cell ID, may have a value from 0 to 2^(16-1). When Equation 64 or 65 is used, if the $n_{ID}$ value is not signaled to the UE via the higher layer or, due to the RRC state change (RRC CONNECTED/RRC INACTIVE/RRC IDLE), the UE is unable to use the previous $n_{ID}$ value, the UE assumes $n_{ID}=n_{RNTI}$ (i.e., the RNTI applied to the PDSCH transmission).

Meanwhile, in Equation 64 or 65, when µ>1, adjacent slots use the same $c_{init}$. Thus, interference randomizing performance may be deteriorated. This is why if one slot correlation with the interference sequence is high, the subsequent, consecutive $N_{slot}^{subframe,\mu}-1$ slots may be likewise influenced by the high correlation of interference. To avoid this, an additional modification as expressed in Equation 66 may be considered.

$$c_{init}=n_{ID} \cdot 2^A + q \cdot 2^B + (n_s \bmod N_{slot}^{subframe,\mu}) \cdot 2^C + N_{ID}^{cell} \quad \text{Equation 66}$$

In this example, it should be noted that sequence initialization has been assumed to be performed at the start of each slot. Although in this example, it has been assumed that A=15, B=14, and C=10 considering the above-discussed payload of q, $n_s$, $n_{ID}$, upon actual application, the exact values may be modified depending on determination of the payload per parameter. For example, PUSCH scrambling uses only a single codeword. Thus, q is omitted, and the following modified Equation 67 may apply.

$$c_{init}=n_{ID} \cdot 2^A + (n_s \bmod N_{slot}^{subframe,\mu}) \cdot 2^C + N_{ID}^{cell} \quad \text{Equation 67}$$

Here, A=14, and C=10. Equation 67 may apply likewise when different scramblings are not used depending on codewords in the case of PDSCH scrambling, that is, when q is omitted.

According to Equation 66 or 67, sequence initialization is applied differently, but it is repeated every $N_{slot}^{subframe,\mu}$th slot. Thus, if the $N_{slot}^{subframe,\mu}$ value is large, there may be a likelihood of occurrence of an issue due to the high correlation with the interference sequence as expressed in Equation 64.

$$c_{init}=n_{ID} \cdot 2^A + q \cdot 2^B + (\{n_s \cdot N_{ID}^{cell}\} \bmod N_{slot}^{subframe,\mu}) \cdot 2^C + N_{ID}^{cell} \quad \text{Equation 68}$$

In this example, it should be noted that sequence initialization has been assumed to be performed at the start of each slot. Although in this example, it has been assumed that A=15, B=14, and C=10 considering the above-discussed payload of q, $n_s$, $n_{ID}$, $N_{ID}^{cell}$, upon actual application, the exact values may be modified depending on determination of the payload per parameter. Equation 68 is a variation to Equation 66 and is an example of allowing each cell to use a different repetitive pattern by multiplying the slot number by the cell ID to address the issue with Equation 66 (the initialized value repeated every $N_{slot}^{subframe,\mu}$th slot). The example in which q is omitted is similar to Equation 67 or 65 and is not described herein.

In Equations 64 to 68, $n_{ID}$ is a value UE-specifically set by high layer signaling and, like RNTI, may have a value from 0 to 2^(16-1). Equations 64 to 68, as compared with Equation 50, replace the physical cell ID ($N_{ID}^{cell}$) with the RNTI-related portion ($n_{RNTI}$) by high layer signaling, ensuring a larger freedom than Equation 50. When Equations 64 to 68 are used, if the $n_{ID}$ value is not signaled to the UE by higher layer or, due to the RRC state change (RRC CONNECTED/RRC INACTIVE/RRC IDLE), the UE is unable to use the previous $n_{ID}$ value, the UE assumes $n_{ID}=n_{RNTI}$ (i.e., the RNTI applied to the PDSCH transmission). Equation 62 assumes use of the physical cell ID. If the physical cell ID is omitted, the following modifications are possible.

$$c_{init}=n_{ID} \cdot 2^A + q \cdot 2^B + \lfloor n_s/N_{slot}^{subframe,\mu} \rfloor \quad \text{Equation 69}$$

$$c_{init}=n_{ID} \cdot 2^A + \lfloor n_s/N_{slot}^{subframe,\mu} \rfloor \quad \text{Equation 70}$$

$$c_{init}=n_{ID} \cdot 2^A + q \cdot 2^B + (n_s \bmod N_{slot}^{subframe,\mu}) \quad \text{Equation 71}$$

$$c_{init}=n_{ID} \cdot 2^A + (n_s \bmod N_{slot}^{subframe,\mu}) \quad \text{Equation 72}$$

$$c_{init}=n_{ID} \cdot 2^A + q \cdot 2^B + (\{n_s \cdot N_{ID}^{cell}\} \bmod N_{slot}^{subframe,\mu}) \quad \text{Equation 73}$$

In this case, under the assumption of q and n_s payload as described above, A=5 and B=4 may be used in Equations 69, 71, and 73, and A=4 in Equations 70 and 72.

When one of Equations 69 to 73 is used, if the $n_{ID}$ value is not signaled to the UE by higher layer or, due to the RRC state change (RRC CONNECTED/RRC INACTIVE/RRC IDLE), the UE is unable to use the previous $n_{ID}$ value, the UE may assume 1) $n_{ID}=n_{RNTI}$ (i.e., the RNTI applied to the PDSCH transmission) or 2) $n_{ID}=N_{ID}^{cell}$ (i.e., physical cell ID). If 2) $n_{ID}=N_{ID}^{cell}$ (i.e., physical cell ID) is assumed, among the 16 bits of $n_{ID}$, the remaining LSB or MSB bits are filled with predetermined, specific values such as 0, . . . , 0.

In the examples from Equation 62 to Equation 73, the length $M_{bit}^{(q)}$ of the bit block targeted in performing the scrambling of Equation 3 was defined as the number of bits included in the codeword q transmitted in one slot on the channel (PDSCH, PDCCH, or PMCH). Meanwhile, as set forth above, in NR, slot or non-slot structures may be mixed and, in this case, different lengths of scrambling sequences negatively influence interference randomizing. To reduce performance deterioration due to uneven interference randomization, it may be agreed that $M_{bit}^{(q)}$ may be smaller than the number of bits included in codeword q transmitted in one slot. As an example, 1) the length $M_{bit}^{(q)}$ of the bit block for scrambling may be defined as the number of bits included in codeword q transmitted in one OFDM symbol, 2) the length $M_{bit}^{(q)}$ of the bit block for scrambling may be defined as the number of bits included in codeword q transmitted in one codeblock (CB), or 3) the length $M_{bit}^{(q)}$ of the bit block for scrambling may be defined as the number of bits included in codeword q transmitted in one codeblock group (CBG). If one example of 1), 2), and 3) is applied to Equations 62 to 73, the terms related to $n_s$ in Equations 62 to 73 are extended as follows.

$$\ldots + (L(n_s+1)+l+1) \cdot 2^C + \ldots \quad \text{Equation 74}$$

In Equation 74, L may be agreed on as 1) the number of OFDM symbols, 2) the number of CBs, or 3) the number of CBGs in one slot according to the above examples, and l may also be agreed on as 1) OFDM symbol number, 2) CB number, or 3) CBG number according to the above examples.

The UE may receive the PDSCH to receive, e.g., RMSI, SIB, or paging, even before RRC configured by the base station. Similarly, the UE may transmit the PUSCH for message 3 (Msg3) even before RRC configured by the base station. In this case, since the UE has no RRC information configured by the base station, the UE needs to assume default values for some parameters in calculating $c_{init}$ of the examples. As an example, if the UE is not particularly assigned RNTI to be used for PDSCH or PUSCH scrambling by the base station, in the above examples, $n_{RNTI}$ may be agreed to be defined by C-RNTI.

In the second example for PDSCH scrambling, based on additional parameter(s) other than the above-described $n_{RNTI}$, q, $n_s$, and $n_{ID}$ (or $N_{ID}^{cell}$), $c_{init}$ is defined. The additional parameters may be configured by high layer signaling, and specific contents may be SSB ID (I_SSB), or bandwidth part ID (BWP_ID), or carrier ID (C_ID), or a random value set by the base station. As an example, if the SSB ID is applied as an additional parameter, Equations 62 to 73 above may be modified as Equations 75 to 78 below. The SSB may be called in other terms, such as SS/PBCH block.

$$c_{init} = n_{ID} \cdot 2^A + q \cdot 2^B + \left\lfloor \frac{n_s}{N_{slot}^{subframe,\mu}} \right\rfloor \cdot 2^C + I_{SSB} \quad \text{Equation 75}$$

$$c_{init} = n_{ID} \cdot 2^A + q \cdot 2^B + (n_s \bmod N_{slot}^{subframe,\mu}) \cdot 2^C + I_{SSB} \quad \text{Equation 75}$$

$$c_{init} = \quad \text{Equation 77}$$
$$n_{ID} \cdot 2^A + q \cdot 2^B + (\{n_s \cdot n_{ID}\} \bmod N_{slot}^{subframe,\mu}) \cdot 2^C + I_{SSB}$$

$$c_{init} = n_{ID} \cdot 2^A + q \cdot 2^B + \quad \text{Equation 78}$$
$$(\{n_s \cdot [2n_{ID} + 1]\} \bmod N_{slot}^{subframe,\mu}) \cdot 2^C + I_{SSB}$$

In Equations 75 to 78, I_SSB may be configured of six bits including all of 1) 0 to 63 of available SSB index or may be configured of 3 LSBs of SS/PBCH block index alone which are transferred by 2) some of them, i.e., PBCH DMRS. At this time, according to the context, the A, B, C, and D values may be properly calculated. A detailed description may be inferred from Equations 51 to 56 and is not given below. In Equations 75 to 78, q may be omitted depending on PUSCH and PDSCH transmission contexts as set forth above with reference to Equations 62 to 73 and, in such a case, A, C, and D are properly adjusted depending on the omission of q.

Seventh Embodiment

Similar to the first embodiment, in the seventh embodiment, a method of performing data scrambling in the NR system is proposed. Similar to LTE, NR may perform data scrambling using a PN sequence. In this case, the PN sequence may be generated based on various lengths of gold sequences, such as length-31 Gold sequence or length-63 Gold sequence. In the instant embodiment, $c_{init}$ configuration methods for initializing the sequence based on the length-31 gold sequence with an LFSR structure as expressed in Equation 1 are provided.

As an example, PDSCH scrambling needs 1) the capability of independent interference randomizing per RNTI kind, 2) the capability of independent interference randomizing per codeword upon transmission of one or more codewords, 3) the capability of independent interference randomizing per specific time unit, e.g., slot or OFDM symbol, and 4) the capability of independent interference randomizing per specific space unit, e.g., cell/beam/TRP.

Thus, in the first example for PDSCH scrambling, based on the four parameters $n_{RNTI}$, q, $n_s$, and $n_{ID}^{cell}$, $c_{init}$ is defined. At this time, $n_{RNTI}$ has a 16-bit payload, q has one-bit payload to differentiate up to two codewords, and $N_{ID}^{cell}$ has a 10-bit payload since it has values from 0 to 1007. Meanwhile, in the case of $n_s$, since the NR system supports numerologies as shown in Table 14, the number of slots in one frame constituted of 10 subframes with 1 ms duration is as shown in Table 15. In Table 15, $N_{slot}^{frame,\mu}$ is the number of slots included in one frame, i.e., 10 ms, and $N_{slot}^{subframe,\mu}$ is the number of slots included in one subframe, i.e., 1 ms.

TABLE 14

| μ | Δf = $2^\mu$ ·15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Supported Transmission Numerologies

TABLE 15

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Number of OFDM symbols per slot, $N_{symb}^{slot}$, for normal cyclic prefix

Table 15 means that when slot number $n_s$ is defined based on one frame like in LTE, the maximum value of $n_s$ may be varied depending on the numerology. Thus, the following two methods may be considered in applying the slot number or OFDM symbol number to $c_{init}$.

Assuming the possible maximum value, i.e., $N_{slot}^{frame,\mu}$, $n_s$ may require a payload up to 9 bits (i.e., $n_s \in \{0, 1, \ldots, N_{slot}^{frame,\mu}-1\}$). This is an inefficient requirement, and unless $n_s$-based initialization is used, $c_{init}$ is defined as expressed in Equation 79.

$$c_{init} = n_{RNTI} 2^{11} + q 2^{10} + n_{ID} \quad \text{Equation 79}$$

In Equation 79, $n_{ID}$ is a value UE-specifically set by high layer signaling and, like the physical cell ID, may have a value from 0 to 1,007. If the $n_{ID}$ value is not signaled to the UE by higher layer or, due to the RRC state change (RRC CONNECTED/RRC INACTIVE/RRC IDLE), the UE is unable to use the $n_{ID}$ value, the UE assumes $n_{ID} = N_{ID}^{Cell}$ (i.e., physical cell ID).

It may be identified from Equation 79 that since 16 bits for $n_{RNTI}$, one bit for q, and 10 bits for $n_{ID}$ are needed, a payload of a total of 27 bits is used. Thus, additional information of up to 4 bits may be used for scrambling initialization.

As an example, data scrambling initialization may be performed on part of the information transmitted by the DCI allocating the PDSCH or PUSCH.

Ex 1) HARQ process number: A scrambling sequence is initialized by the HARQ process number ($n_{ID}^{HARQ}$) transmitted by the DCI allocating the PDSCH. If $n_{ID}^{HARQ}$ has a 3-bit long in FDD and 4-bit long in TDD, according to the maximum value, A=15, B=14, and C=10 in Equation 80. A similar way may apply even when the payload of $n_{ID}^{HARQ}$ differs.

$$c_{init}=n_{RNTI}\cdot 2^A+q\cdot 2^B+n_{ID}^{HARQ}\cdot 2^C+n_{ID} \qquad \text{Equation 80}$$

Ex 2) MCS's LSB or MSB M bit: The scrambling sequence is initialized by modulation and coding scheme (MCS) transmitted by the DCI allocating the PDSCH. If the MCS has a payload exceeding four bits, it may be agreed that, e.g., of the MCS bit sequence, M least significant bits (LSBs) or most significant bits (MSBs) alone are used. For example, M may be one of 1, 2, 3, and 4. Under the assumption of 10 bits for $n_{ID}$, three bits for $n_{ID}^{MCS}$, one bit for q, and 16 bits for $n_{RNTI}$ in Equation 81, A=14, B=13, and C=10. With the payload of the elements, it is apparent that A, B, and C in Equation 80 may be properly adjusted.

$$c_{init}=n_{RNTI}\cdot 2^A+q\cdot 2^B+n_{ID}^{MCS}\cdot 2^C+n_{ID} \qquad \text{Equation 81}$$

The instant example is not limited to HARQ process number or MCS, but may rather be applied likewise to other pieces of information in the DCI. Further, it may also be possible to perform signaling, separately from PDSCH/PUSCH allocation, by the cell or group common DCI, but not alone by the UE-specific DCI allocating the PDSCH or PUSCH. In this case, it may be agreed that a change in c_int by reception of common DCI is applied a predetermined time (e.g., X slots or X OFDM symbols) after receiving the common DCI. A specific example for such case is similar to Ex1 or Ex2 and is not described herein.

In Equations 80 and 81, $n_{ID}$ is a value UE-specifically set by high layer signaling and, like the physical cell ID, may have a value from 0 to 1,007. If the $n_{ID}$ value is not signaled to the UE by higher layer or, due to the RRC state change (RRC CONNECTED/RRC INACTIVE/RRC IDLE), the UE is unable to use the previous $n_{ID}$ value, the UE assumes $n_{ID}=N_{ID}^{Cell}$ (i.e., physical cell ID).

Eighth Embodiment

The eighth embodiment proposes a method of sequence generation and initialization for data scrambling upon applying shortened TTI (sTTI).

LTE provides the following sTTI pattern or subslot patterns for latency reduction. Referring to Table 10, the following definition is made for downlink, depending on what number of OFDM symbol the shortened PDSCH (sPDSCH) is started: pattern 1 is used when it starts at {1st or 3rd} OFDM symbol and pattern 2 when starting at the second OFDM symbol. Here, pattern 1 consists of a total of six subslots, and the subslots consist of (3, 2, 2, 2, 2, 3) OFDM symbols. Pattern 2 consists of a total of six subslots, and the subslots consist of (2, 3, 2, 2, 2, 3) OFDM symbols. The uplink consists of a total of six subslots, and each subslot supports a single subslot pattern consisting of (3, 2, 2, 2, 2, 3) OFDM symbols.

TABLE 16

|  | Subslot number | | | | | |
| --- | --- | --- | --- | --- | --- | --- |
|  | 0 | 1 | 2 | 3 | 4 | 5 |
| Uplink substot pattern | 0, 1, 2 | 3, 4 | 5, 6 | 7, 8 | 9, 10 | 11, 12, 13 |
| Downlink subslot pattern 1 | 0, 1, 2 | 3, 4 | 5, 6 | 7, 8 | 9, 10 | 11, 12, 13 |
| Downlink subslot pattern 2 | 0, 1 | 2, 3, 4 | 5, 6 | 7, 8 | 9, 10 | 11, 12, 13 |

OFDM Symbols in Different Subslots

At this time, since the base station may perform independent scheduling for each subslot, scrambling on the subslot may be performed according to one of the following examples.

Ex 1) to each codeword q, the bit block is $b^{(q)}(0), \ldots, b^{(q)}(M_{bit}^{(q)}-1)$ is scrambled by Equation 82. Here, $M_{bit}^{(q)}$ is the number of bits included in codeword q transmitted in one subslot on the channel (PDSCH, PDCCH, or PMCH).

$$\tilde{b}^{(q)}(i)=(b^{(q)}(i)+c^{(q)}(i))\bmod 2 \qquad \text{Equation 82}$$

In Equation 82, the scrambling sequence $c^{(q)}(i)$ is determined by Equation 1, and the scrambling sequence is initialized by $c_{init}$ at the start of each subslot. Here, $c_{init}$ is determined as expressed in Equation 83.

$$c_{init}=n_{RNTI}\cdot 2^{14}+q\cdot 2^{13}+\lfloor n_s/2 \rfloor\cdot 2^9+N_{ID}^{cell} \qquad \text{Equation 83}$$

Here, $n_{RNTI}$ is the RNTI allocated upon PDSCH transmission, and $n_s$ is the slot number in the transmission frame, $N_{ID}^{cell}$ is the Cell ID, and $N_{ID}^{MBSFN}$ is the MBSFN area identity. Since up to two codewords may be transmitted in one subframe, $q \in \{0,1\}$. If a single codeword is transmitted, q is 0. The block $\tilde{b}^{(q)}(0), \ldots, \tilde{b}^{(q)}(M_{bit}^{(q)}-1)$ of bits scrambled by Equation 82 goes through modulation, codeword-to-layer mapping, precoding, or other proper procedures depending on the context and is then mapped to the RE and is transmitted. In the instant example (Ex. 1), it may be shown that scrambling sequence initialization is performed every subslot, but the initial value c_init is the same for all in one subframe.

Ex 2) to each codeword q, the bit block $b^{(q)}(0), \ldots, b^{(q)}(M_{bit}^{(q)}-1)$ is scrambled by Equation 84. Here, $M_{bit}^{(q)}$ is the number of bits included in codeword q transmitted in one subslot on the channel (PDSCH, PDCCH, or PMCH).

$$\tilde{b}^{(q)}(i)=(b^{(q)}(i)+c^{(q)}(i))\bmod 2 \qquad \text{Equation 84}$$

In Equation 84, the scrambling sequence $c^{(q)}(i)$ is determined by Equation 1, and the scrambling sequence is initialized by $c_{init}$ at the start of each subslot. Here, $c_{init}$ is determined as expressed in Equation 85.

$$c_{init}=n_{RNTI}\cdot 2^{14}+n_s\cdot 2^9+N_{ID}^{cell} \qquad \text{Equation 85}$$

Here, $n_{RNTI}$ is the RNTI allocated upon PDSCH transmission, and $n_s$ is the slot number in the transmission frame, $N_{ID}^{cell}$ is the Cell ID. Given that up to one codeword alone may be transmitted in the case of sTTI, a modification was made so that q was omitted from Equation 85 and, to ensure interference randomization, at least, between slots, other initial values may be used for each slot. The block $\tilde{b}^{(q)}(0), \ldots, \tilde{b}^{(q)}(M_{bit}^{(q)}-1)$ of bits scrambled by Equation 85 goes through modulation, codeword-to-layer mapping, precoding, or other proper procedures depending on the context and is then mapped to the RE and is transmitted. In the instant example (Ex. 2), it may be shown that scrambling sequence initialization is performed every subslot, but the initial value c_init is the same for all in one slot.

Ex 3) to each codeword q, the bit block $b^{(q)}(0), \ldots b^{(q)}(M_{bit}^{(q)}-1)$ is scrambled by Equation 86. Here, $M_{bit}^{(q)}$ is the number of bits included in codeword q transmitted in one subslot on the channel (PDSCH, PDCCH, or PMCH).

$$\tilde{b}^{(q)}(i)=(b^{(q)}(i)+c^{(q)}(i))\bmod 2 \qquad \text{Equation 86}$$

In Equation 86, the scrambling sequence $c^{(q)}(i)$ is determined by Equation 1, and the scrambling sequence is initialized by $c_{init}$ at the start of each subslot. Here, $c_{init}$ is determined as expressed in Equation 87.

$$c_{init}=n_{RNTI}\cdot 2^{15}+(6\cdot(\lfloor n_s/2 \rfloor+1)+n_{subslot}+1)\cdot 2^9+N_{ID}^{cell} \qquad \text{Equation 87}$$

Here, $n_{RNTI}$ is the RNTI allocated up PDSCH transmission, $n_s$ the slot number in the transmission frame, $n_{subslot}$ the subslot number in one subframe, and $N_{ID}^{cell}$ the Cell ID. Given that up to one codeword alone may be transmitted in the case of sTTI, a modification was made so that q was omitted from Equation 87 and, to ensure interference randomization among all the subslots, other initial values may be used for each subslot. The block $\tilde{b}^{(q)}(0), \ldots, \tilde{b}^{(q)}(M_{bit}^{(q)}-1)$ of bits scrambled by Equation 87 goes through modulation, codeword-to-layer mapping, precoding, or other proper procedures depending on the context and is then mapped to the RE and is transmitted. In the instant example (Ex. 3), it may be shown that scrambling sequence initialization is performed every subslot, but the initial value c_init is the same for all in one slot.

Ex 4) to each codeword q, the bit block $b^{(q)}(0), \ldots, b^{(q)}(M_{bit}^{(q)}-1)$ is scrambled by Equation 88. Here, $M_{bit}^{(q)}$ is the number of bits included in codeword q transmitted in one subslot on the channel (PDSCH, PDCCH, or PMCH).

$$\tilde{b}^{(q)}(i) = (b^{(q)}(i) + c^{(q)}(i)) \bmod 2 \quad \text{Equation 88}$$

In Equation 88, the scrambling sequence $c^{(q)}(i)$ is determined by Equation 1, and the scrambling sequence is initialized by $c_{init}$ at the start of each subslot. Here, $c_{init}$ is determined as expressed in Equation 89.

$$c_{init} = n_{RNTI} \cdot 2^{15} + q \cdot 2^{13} + N_{ID}^{cell} \quad \text{Equation 89}$$

Here, $n_{RNTI}$ is the RNTI allocated upon PDSCH transmission, q the codeword number, and $N_{ID}^{cell}$ the Cell ID. Equation 89 means that upon sTTI transmission, sequence initialization by transmission timing may not be performed. To secure extra interference management capability, an additional modification may be made as expressed in Equation 90.

$$c_{init} = n_{RNTI} \cdot 2^{15} + q \cdot 2^{13} + n_{ID} \quad \text{Equation 90}$$

The block $\tilde{b}^{(q)}(0), \ldots, \tilde{b}^{(q)}(M_{bit}^{(q)}-1)$ of bits scrambled by Equation 90 goes through modulation, codeword-to-layer mapping, precoding, or other proper procedures depending on the context and is then mapped to the RE and is transmitted. In the instant example (Ex. 3), it may be shown that scrambling sequence initialization is performed every subslot, but the initial value c_init is the same for all in one slot. In Equation 90, $n_{ID}$ is a value UE-specifically set by high layer signaling and, like the physical cell ID, may have a value from 0 to 503. If the $n_{ID}$ value is not signaled to the UE by higher layer or, due to the RRC state change (RRC CONNECTED/RRC INACTIVE/RRC IDLE), the UE is unable to use the previous $n_{ID}$ value, the UE assumes $n_{ID} = N_{ID}^{cell}$ (i.e., physical cell ID).

Ninth Embodiment

The ninth embodiment proposes a method of RS sequence generation and initialization upon applying sTTI.

LTE provides the following sTTI pattern or subslot patterns for latency reduction. Referring to Table 10, the following definition is made for downlink, depending on what number of OFDM symbol the shortened PDSCH (sPDSCH) is started: pattern 1 is used when it starts at {1st or 3rd} OFDM symbol and pattern 2 when starting at the second OFDM symbol. Here, pattern 1 consists of a total of six subslots, and the subslots consist of (3, 2, 2, 2, 2, 3) OFDM symbols. Pattern 2 consists of a total of six subslots, and the subslots consist of (2, 3, 2, 2, 2, 3) OFDM symbols. The uplink consists of a total of six subslots, and each subslot supports a single subslot pattern consisting of (3, 2, 2, 2, 2, 3) OFDM symbols.

TABLE 17

|  | Subslot number |  |  |  |  |  |
|---|---|---|---|---|---|---|
|  | 0 | 1 | 2 | 3 | 4 | 5 |
| Uplink substot pattern | 0, 1, 2 | 3, 4 | 5, 6 | 7, 8 | 9, 10 | 11, 12, 13 |
| Downlink subslot pattern 1 | 0, 1, 2 | 3, 4 | 5, 6 | 7, 8 | 9, 10 | 11, 12, 13 |
| Downlink subslot pattern 2 | 0, 1 | 2, 3 | 4, 5 | 6, 7 | 8, 9, 10 | 11, 12, 13 |

At this time, since the base station may perform independent scheduling for each subslot, an RS sequence for the subslot may be generated according to one of the following examples.

Ex 1) As an example, a sequence for sTTI DMRS is generated as expressed in Equation 91.

$$r(m) = \frac{1}{\sqrt{2}}(1 - 2 \cdot c(2m)) + j\frac{1}{\sqrt{2}}(1 - 2 \cdot c(2m+1)), \quad \text{Equation 91}$$

$$m = 0, 1, \ldots, 6N_{RB}^{max,DL} - 1$$

In Equation 91, the scrambling sequence $c^{(q)}(i)$ is determined by Equation 1, and the scrambling sequence is initialized by $c_{init}$ at the start of each subslot. Here, $c_{init}$ is determined as expressed in Equation 92.

$$c_{init} = (\lfloor n_s/2 \rfloor + 1) \cdot (2n_{ID}^{(nSCID)} + 1) \cdot 2^{16} + n_{SCID} \quad \text{Equation 92}$$

Here, $n_s$ is the slot number in the transmission frame, $n_{SCID}$ is the scrambling ID determined by the DCI, and $n_{ID}^{(i)}$, as a value set by higher layer, is the DMRS ID, with two values, i=0 and 1, signaled by the higher layer. If there is no DMRS ID set by the higher layer, then $n_{ID}^{(i)} = N_{ID}^{cell}$. In the instant example (Ex. 1), it may be shown that RS sequence initialization is performed every subslot, but the initial value c_init is the same for all in one subframe.

Ex 2) As an example, a sequence for sTTI DMRS is generated as expressed in Equation 93.

$$r(m) = \frac{1}{\sqrt{2}}(1 - 2 \cdot c(2m)) + j\frac{1}{\sqrt{2}}(1 - 2 \cdot c(2m+1)), \quad \text{Equation 93}$$

$$m = 0, 1, \ldots, 6N_{RB}^{max,DL} - 1$$

In Equation 93, the scrambling sequence $c^{(q)}(i)$ determined by Equation 1, and the scrambling sequence is initialized by $c_{init}$ at the start of each subslot. Here, $c_{init}$ is determined as expressed in Equation 94.

$$c_{init} = (n_s + 1) \cdot (2n_{ID}^{(nSCID)} + 1) \cdot 2^A + n_{SCID} \quad \text{Equation 94}$$

Here, $n_s$ is the slot number in the transmission frame, $n_{SCID}$ is the scrambling ID determined by the DCI, and $n_{ID}^{(i)}$, as a value set by higher layer, is the DMRS ID, with two values, i=0 and 1, signaled by the higher layer. If there is no DMRS ID set by the higher layer, then $n_{ID}^{(i)} = N_{ID}^{cell}$. In the instant example (Ex. 2), it may be shown that RS sequence initialization is performed every subslot, but the initial value c_init is the same for all in one slot. Equation 94 enables extra per-slot interference management over Equation 92. However, A needs to be properly adjusted to, e.g., 15 to 1, in Equation 94.

Ex 3) As an example, a sequence for sTTI DMRS is generated as expressed in Equation 95.

$$r(m) = \frac{1}{\sqrt{2}}(1 - 2 \cdot c(2m)) + j\frac{1}{\sqrt{2}}(1 - 2 \cdot c(2m + 1)),$$

$$m = 0, 1, \ldots, 6N_{RB}^{max,DL} - 1$$

Equation 95

In Equation 95, the scrambling sequence $c^{(q)}(i)$ is determined by Equation 1, and the scrambling sequence is initialized by $c_{init}$ at the start of each subslot. Here, $c_{init}$ is determined as expressed in Equation 96.

$$c_{init} = (6 \cdot (\lfloor n_s/2 \rfloor + 1) + n_{subslot} + 1) \cdot (2n_{ID}^{(nSCID)} + 1) \cdot 2^A + n_{SCID}$$

Equation 96

Here, $n_s$ is the slot number in the transmission frame, $n_{subslot}$ is the subslot number in one subframe, $n_{SCID}$ is the scrambling ID determined by the DCI, and $n_{ID}^{(i)}$, as a value set by the higher layer, is the DMRS ID, with two values, i=0 and 1, signaled via the higher layer. If there is no DMRS ID set by the higher layer, then $n_{ID}^{(i)} = N_{ID}^{cell}$. In the instant example (Ex. 3), it may be shown that RS sequence initialization is performed every subslot, and the initial value c_init is all the same for the slots. At this time, to make the maximum value of c_init smaller than 2^31, A needs to be properly adjusted to, e.g., 14 to 1 in Equation 96.

In the examples (Ex1 to Ex3) for the sTTI DMRS (sDMRS), $n_{SCID}$ may be omitted in which case, given the one-bit payload of $n_{SCID}$, A in Equations 91 to 96 may be properly adjusted.

Tenth Embodiment

Similar to the first embodiment, in the tenth embodiment, a method of performing data scrambling in the NR system is proposed. Similar to LTE, NR may perform data scrambling using a PN sequence. In this case, the PN sequence may be generated based on various lengths of gold sequences, such as length-31 Gold sequence or length-63 Gold sequence. In the instant embodiment, $c_{init}$ configuration methods for initializing the sequence based on the length-31 gold sequence with an LFSR structure as expressed in Equation 1 are provided.

As an example, PDSCH scrambling needs 1) the capability of independent interference randomizing per RNTI kind, 2) the capability of independent interference randomizing per codeword upon transmission of one or more codewords, 3) the capability of independent interference randomizing per specific time unit, e.g., slot or OFDM symbol, and 4) the capability of independent interference randomizing per specific space unit, e.g., cell/beam/TRP.

Thus, in the first example for PDSCH scrambling, based on the four parameters $n_{RNTI}$, q, $n_s$, and $N_{ID}^{cell}$, $c_{init}$ is defined. At this time, $n_{RNTI}$ has a 16-bit payload, q has one-bit payload to differentiate up to two codewords, and $N_{ID}^{cell}$ has a 10-bit payload since it has values from 0 to 1007. Meanwhile, in the case of $n_s$, since the NR system supports numerologies as shown in Table 18, the number of slots in one frame constituted of 10 subframes with 1 ms duration is as shown in Table 19. In Table 19, $N_{slot}^{frame,\mu}$ is the number of slots included in one frame, i.e., 10 ms, and $N_{slot}^{subframe,\mu}$ is the number of slots included in one subframe, i.e., 1 ms.

TABLE 18

| μ | Δf = $2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Supported Transmission Numerologies

TABLE 19

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Number of OFDM symbols per slot, $N_{symb}^{slot}$, for normal cyclic prefix

Table 19 means that when slot number $n^s$ is defined based on one frame like in LTE, the maximum value $n_s$ may be varied depending on the numerology. Thus, the following two methods may be considered in applying the slot number or OFDM symbol number to $c_{init}$.

Assuming the possible maximum value, i.e., $N_{slot}^{frame,\mu} = 320$, $n_s$ may require a payload up to 9 bits (i.e., $n_s \in \{0, 1, \ldots, N_{slot}^{frame,\mu}-1\}$). This is an inefficient requirement, and unless $n_s$-based initialization is used, $c_{init}$ is defined as expressed in Equation 97.

$$c_{init} = n_{RNTI} 2^{15} + q 2^{14} + n_{ID}$$

Equation 97

In Equation 97, $n_{ID}$ is a value UE-specifically set by high layer signaling and may have a value from 0 to 2^10. If the $n_{ID}$ value is not signaled to the UE by higher layer or, due to the RRC state change (RRC CONNECTED/RRC INACTIVE/RRC IDLE), the UE is unable to use the previous $n_{ID}$ value, the UE assumes $n_{ID} = N_{ID}^{Cell}$ (i.e., physical cell ID).

As an example, data scrambling initialization may be performed on part of the information transmitted by the DCI allocating the PDSCH or PUSCH.

Ex 1) HARQ process number: In this example, a scrambling sequence is initialized by the HARQ process number ($n_{ID}^{HARQ}$) transmitted by the DCI allocating the PDSCH. If $n_{ID}^{HARQ}$ has a 3-bit payload, A=14, B=13, and C=10 in Equation 98. IF $n_{ID}^{HARQ}$ has a variable payload that is, e.g., 3-bit long in FDD and 4-bit long in TDD, according to the maximum value, A=15, B=14, and C=10 in Equation 98. A similar way may apply even when the payload of $n_{ID}^{HARQ}$ differs.

$$c_{init} = n_{RNTI} 2^A + q \cdot 2^B + n_{ID}^{HARQ} \cdot 2^C + n_{ID}$$

Equation 98

Ex 2) MCS's LSB or MSB M bit: In this example, a scrambling sequence is initialized by the MCS signaling transmitted by the DCI allocating the PDSCH. If the MCS has a payload exceeding four bits, it may be agreed that, e.g., of the MCS bit sequence, M LSBs or MSBs alone are used. For example, M may be one of 1, 2, 3, and 4. Under the assumption of 10 bits for $n_{ID}$, three bits for $n_{ID}^{MCS}$, one bit for q, and 16 bits for $n_{RNTI}$ in Equation 99, A=14, B=13, and C=10. With the payload of the elements, it is apparent that A, B, and C in Equation 80 may be properly adjusted.

$$c_{init} = n_{RNTI} 2^A + q \cdot 2^B + n_{ID}^{MCS} \cdot 2^C + n_{ID}$$

Equation 99

Ex 3) Redundancy version of transport block 1 or transport blocks 1 and 2: In this example, a scrambling sequence is initialized by the redundancy version (RV) signaling transmitted by the DCI allocating the PDSCH. One RV is signaled per transport block allocated to the PDSCH. For up to two RVs, 1) only one of the two, e.g., the RV of transport block 1, is always used for scrambling sequence initialization, or 2) both the RVs may be used for scrambling sequence initialization. If only one RV of the two is used for scrambling initialization, under the assumption of 10 bits for $n_{ID}$, two bits for $n_{ID}^{RV}$, one bit for q, and 16 bits for $n_{RNTI}$ in Equation 100, A=15, B=14, and C=10. If both the RVs are used for scrambling initialization, under the assumption of 10 bits for $n_{ID}$, four bits for $n_{ID}^{RV}$, one bit for q, and 16 bits for $n_{RNTI}$ in Equation 100, A=15, B=14, and C=10. At this time, if transport block 2 is not allocated so that the second RV is not signaled, the bits corresponding to the RV may be fixed to a pre-agreed value (e.g., 00). If the payload of the elements is varied, it is apparent that A, B, and C in Equation 100 may be properly adjusted.

$$c_{init} = n_{RNTI} \cdot 2^A + q \cdot 2^B + n_{ID}^{RV} \cdot 2^C + n_{ID} \quad \text{Equation 100}$$

The instant example is not limited to HARQ process number, MCS, or RV, but may rather be applied likewise to other pieces of information in the DCI. Further, it may also be possible to perform signaling, separately from PDSCH/PUSCH allocation, by the cell or group common DCI, but not alone by the UE-specific DCI allocating the PDSCH or PUSCH. In this case, it may be agreed that a change in c_int by reception of common DCI is applied a predetermined time (e.g., X slots or X OFDM symbols) after receiving the common DCI. A specific example for such case is similar to Ex1 or Ex2 and is not described herein.

In Equations 98, 99, and 100, $n_{ID}$ is a value UE-specifically set by high layer signaling and may have a value from 0 to 2^10. If the $n_{ID}$ value is not signaled to the UE by higher layer or, due to the RRC state change (RRC CONNECTED/RRC INACTIVE/RRC IDLE), the UE is unable to use the previous $n_{ID}$ value, the UE assumes $n_{ID}=N_{ID}^{Cell}$ (i.e., physical cell ID).

It may be shown that if the base station performs data scrambling according to Equation 97, the same scrambling initialization is used regardless of PDSCH transmission timing (e.g., slot/subframe number of OFDM symbol number). This is useful in the environment where data processing time is short, such as 30 kHz or more SCS or licensed assisted access (LAA), or it is unknown when data is to be transmitted but, if retransmission is performed often or there are many interfering UEs, this may deteriorate performance due to a reduction in interference randomization probability. Thus, the base station may use an additional data scrambling initialization method similar to those of Equations 98 to 100 other than the data scrambling initialization method of Equation 97 and may inform the UE what data scrambling has been used on the PDSCH. In the case where two or more data scrambling initialization methods are supported, a method for the base station to notify the UE what data scrambling has been used may be 1) to explicitly indicate the selected data scrambling method by high layer signaling, e.g., RRC signaling, or 2) to implicitly determine the data scrambling method according to the PDSCH transmission type. If the data scrambling method is indicated by RRC signaling, the base station may indicate one data scrambling method for all PDSCH transmissions, and it may also be apparent that a different data scrambling method may be indicated per PDSCH transmission type. It should be noted that in the above description, PDSCH transmission type may be used in various meanings, such as differentiated depending on slot-based scheduling (14 OFDM symbol based scheduling) or non-slot-based scheduling (2-/4-/7-OFDM symbol based scheduling), differentiated depending on service types, such as eMBB/mMTC/URLLC/LAA, or differentiated according to RNTI types applied to the PDSCH, such as C-RNTI/P-RNTI/SI-RNTI.

Eleventh Embodiment

In this embodiment, a method of initialization for generating a CSI-RS sequence is described. One major usage of CSI-RS is to measure the UE's mobility. In this case, the UE measures CSI-RSs transmitted from the neighbor cells as well as from its serving cell. If the CSI-RS sequence is initialized based on $n_s$ not repeated within one frame, the UE may be unaware of the exact value of the CSI-RS sequence until the PBCH of the neighbor cell is decoded. However, if the CSI-RS sequence is repeated every 5 ms, i.e., in half frame units, the UE may be exactly aware of the CSI-RS sequence only by receiving the PBCH DMRS transmitting three LSBs of SS/PBCH block index, which advantageously eliminates the need for decoding the PBCH of the neighbor cell.

To that end, the following sequence generation and initialization may be used.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{Equation 101}$$

$$m = 0, 1, \ldots, M \cdot N_{RB}^{max,DL} - 1$$

In Equation 101, M may be 1) the number of CSI-RS ports included in one CSI-RS CDM group, 2) the number of CSI-RS ports included in one CSI-RS resource, or 3) the CSI-RS RE density set by higher layer. In the case of 1), M may be configured up to eight by higher layer and, in the case of 2), M may be configured up to 32 by higher layer. This is intended for generating a long gold sequence output in one CDM group or CSI-RS resource and properly sharing it per port. In Equation 101, the system bandwidth $N_{RB}^{max,DL}$ is used but, in practice, may be replaced with, e.g., the bandwidth of bandwidth part (BWP). In this case, it may be agreed that to share the same sequence between the UEs assigned different bandwidths of BWPs, the base station and the UE first generate a sequence based on the system bandwidth (or $N_{RB}^{max,DL}$) (i.e., generating the sequence based on the absolute index of PRB) and, upon actual transmission, use only sequences corresponding to the allocated bandwidth (i.e., the bandwidth of the activated BWP).

$$c_{init} = 2^A \cdot (\{14 \cdot (n_s+1)+l+1\} \mod \{N_{slot}^{frame,\mu}/2\}) \cdot (2 \cdot N_{ID}^{CSI}+1) + 2^B \cdot N_{ID}^{CSI} + N_{CP} \quad \text{Equation 102}$$

In Equation 102, N_CP may be omitted and, depending on whether N_CP is omitted, B=1 1) if N_CP is present, and B=0 if N_CP is absent. Likewise, 1) if N_CP is present, A=11 and, if N_CP is absent, A=10.

Meanwhile, similar to the data scrambling example of embodiment 1, even in the case of Equation 102, as the number of CSI-RS IDs increases, and the number of slots in one frame increases according to numerology, the length of LFSR-31 gold sequence may be exceeded. Thus, for sequence initialization, the following time domain scaling may be taken into account.

$$c_{init} = (2^{10} \times ((14 n_s + l + 1)(2 N_{ID}^{CSI} + 1) + N_{ID}^{CSI})) \mod 2^{31} \quad \text{Equation 103}$$

Here, n_s is the slot number in the transmission frame, l is the OFDM symbol number in the slot, and $N_{ID}^{CSI}$ is the CSI-RS ID set by higher layer. The following is possible similar to Equation 103.

$$c_{init}=2^A \cdot (\{14 \cdot \lfloor n_s/N_{slot}^{subframe,\mu} \rfloor+1)+l+ 1\} \bmod \{N_{slot}^{frame,\mu}/2\}) \cdot (2 \cdot N_{ID}^{CSI}+1)+2^B \cdot N_{ID}^{CSI}+ N_{CP} \quad \text{Equation 104}$$

$$c_{init}=2^A \cdot (\{14 \cdot (n_s \bmod N_{slot}^{subframe,\mu}+1)+l+ 1\} \bmod \{N_{slot}^{frame,\mu}/2\}) \cdot (2 \cdot N_{ID}^{CSI}+1)+2^B \cdot N_{ID}^{CSI}+ N_{CP} \quad \text{Equation 105}$$

$$c_{init}=2^A \cdot (14 \cdot (\lfloor n_s/N_{slot}^{subframe,\mu} \rfloor+1)+l+1) \cdot (2 \cdot N_{ID}^{CSI}+ 1)+2^B \cdot N_{ID}^{CSI}+N_{CP} \quad \text{Equation 106}$$

$$c_{init}=2^A \cdot (14 \cdot (n_s \bmod N_{slot}^{subframe,\mu}+1)+l+1) \cdot (2 \cdot N_{ID}^{CSI}+ 1)+2^B \cdot N_{ID}^{CSI}+N_{CP} \quad \text{Equation 107}$$

In Equations 104 to 107, N_CP may be omitted and, depending on whether N_CP is omitted, B=1 1) if N_CP is present, and B=0 if N_CP is absent. Likewise, 1) if N_CP is present, A=11 and, if N_CP is absent, A=10.

Equations 103 to 107 regard a method of performing initialization by the CSI-RS timing information n_s and l and a non-linear function between l and cell ID $N_{ID}^{CSI}$. If initialization is performed by the CSI-RS timing information n_s and the linear function between l and CSI-RS ID $N_{ID}^{CSI}$, the following options may be considered.

$$c_{init}=2^A \cdot (\{14 \cdot (\lfloor n_s/N_{slot}^{subframe,\mu} \rfloor+1)+l+ 1\} \bmod \{N_{slot}^{frame,\mu}/2\})+2^B \cdot N_{ID}^{CSI}+N_{CP} \quad \text{Equation 108}$$

$$c_{init}=2^A \cdot (\{14 \cdot (n_s \bmod N_{slot}^{subframe,\mu}+1)+l+ 1\} \bmod \{N_{slot}^{frame,\mu}/2\})+2^B \cdot N_{ID}^{CSI}+N_{CP} \quad \text{Equation 109}$$

In Equations 108 and 109, N_CP may be omitted and, depending on whether N_CP is omitted, B=1 1) if N_CP is present, and B=0 if N_CP is absent. Likewise, 1) if N_CP is present, A=11 and, if N_CP is absent, A=10.

In the second example of CSI-RS sequence generation, based on additional parameter(s) other than n_s, l, and $N_{ID}^{CSI}$, $c_{init}$ is defined. The additional parameters may be configured by high layer signaling, and specific contents may be SSB ID (I_SSB), or bandwidth part ID (BWP_ID), or carrier ID (C_ID), or a random value set by the base station. As an example, if the SSB ID is applied as an additional parameter, Equations 108 and 109 above may be modified as Equations 110 and 111. The SSB may be called in other terms, such as SS/PBCH block.

$$c_{init}=2^A \cdot (\{14 \cdot (\lfloor n_s/N_{slot}^{subframe,\mu} \rfloor+1)+l+ 1\} \bmod \{N_{slot}^{frame,\mu}/2\})+2^B \cdot N_{ID}^{CSI}+I_{SSB} \quad \text{Equation 110}$$

$$c_{init}=2^A \cdot (\{14 \cdot (n_s \bmod N_{slot}^{subframe,\mu}+1)+l+ 1\} \bmod \{N_{slot}^{frame,\mu}/2\})+2^B \cdot N_{ID}^{CSI}+I_{SSB} \quad \text{Equation 111}$$

In Equations 110 and 111, N_CP has been omitted for ease of description. In Equations 110 and 111, I_SSB may be configured of six bits including all of 1) 0 to 63 of available SSB index or may be configured of 3 LSBs of SS/PBCH block index alone which are transferred by 2) some of them, i.e., PBCH DMRS. At this time, according to the context, the A, B, C, and D values may be properly calculated.

The base station may use extra CSI-RS sequence generation methods similar to Equations 104 to 111 along with the CSI-RS sequence generation method of Equation 103 and may notify the UE what CSI-RS sequence generation method has been used. In the case where two or more CSI-RS sequence generation methods are supported, a method for the base station to notify the UE what CSI-RS sequence generation method has been used may be 1) to explicitly indicate the selected CSI-RS sequence generation method by high layer signaling, e.g., RRC signaling, or 2) to implicitly determine the CSI-RS sequence generation method according to the PDSCH transmission type. If the CSI-RS sequence generation method is indicated by RRC signaling, the base station may indicate one CSI-RS sequence generation method for all PDSCH transmissions, and it may also be apparent that a different CSI-RS sequence generation method may be indicated per PDSCH transmission type. It should be noted that in the above description, PDSCH transmission type may be used in various meanings, such as differentiated depending on slot-based scheduling (14 OFDM symbol based scheduling) or non-slot-based scheduling (2-/4-/7-OFDM symbol based scheduling), differentiated depending on service types, such as eMBB/mMTC/URLLC/LAA, differentiated according to RNTI types applied to the PDSCH, such as C-RNTI/P-RNTI/SI-RNTI, or differentiated according to synchronous network or asynchronous network. For example, in the case of synchronous network, Equation 103 applies to all CSI-RSs but, in the case of asynchronous network, Equation 103 applies to CSI-RSs for CSI acquisition/beam management/time-frequency tracking while applying other methods of Equations 104 to 111 with a sequence generation repetition periodicity of 5 ms to CSI-RSs (i.e., CSI-RSs from other cells for supporting L3 mobility) for mobility so as to facilitate the UE's mobility RS reception.

Twelfth Embodiment

In this embodiment, a method of initialization for generating a CSI-RS sequence is described.

One major usage of CSI-RS is to measure the UE's mobility. In this case, the UE measures CSI-RSs transmitted from the neighbor cells as well as from its serving cell.

If the CSI-RS sequence is initialized based on $n_s$ not repeated within one frame, the UE may be unaware of the exact value of the CSI-RS sequence until the physical broadcast channel (PBCH) of the neighbor cell is decoded. However, if the CSI-RS sequence is repeated every 5 ms, i.e., in half frame units, the UE may be exactly aware of the CSI-RS sequence only by receiving the PBCH DMRS transmitting three least significant bits (LSBs) of SS/PBCH block index, which advantageously eliminates the need for decoding the PBCH of the neighbor cell.

To that end, sequence generation and initialization may be used and, in connection thereto, Equation 112 below is described.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{Equation 112}$$

$$m = 0, 1, \ldots, M \cdot N_{RB}^{max,DL} - 1$$

In Equation 112 above, M may be 1) the number of CSI-RS ports included in one CSI-RS CDM group, 2) the number of CSI-RS ports included in one CSI-RS resource, or 3) the CSI-RS RE density set by higher layer.

As an example, in the case where M is 1), M may be configured up to eight by higher layer and, as another example, when M is 2), M may be configured up to 32 by higher layer. This is intended for generating a long gold sequence output in one CDM group or CSI-RS resource and properly sharing it per port.

Although in Equation 112, the system bandwidth $N_{RB}^{max,DL}$ has been used, it, as another example, may be replaced with the bandwidth of the bandwidth part (BWP) configured and allocated to the UE upon system application or the maximum bandwidth set for the UE. In this case, it may be set (agreed) that to share the same sequence between the UEs assigned different bandwidths of BWPs, the base station and the UE first generate a sequence based on the system bandwidth (or $N_{RB}^{max,DL}$) (i.e., generating the sequence based on the absolute index of PRB) and, upon actual transmission, use only sequences corresponding to the allocated bandwidth (i.e., the bandwidth of the activated BWP).

In the above example, the system bandwidth information may be known to the UE by various methods. As an example, the UE may recognize the start (or end) of the system bandwidth via the frequency offset set based on the lowest (or highest) synchronization signal (SS) bandwidth.

$$c_{init}=2^{10}\times((14n_{s,f}^\mu+l+1)(2N_{ID}^{CSI}+1)+N_{ID}^{CSI}) \quad \text{Equation 113}$$

In the case where a sequence initialization method similar to that of LTE as in Equation 113 is used, as shown in Tables 3 and 4, $n_{s,f}$ is increased depending on the subcarrier spacing (SCS, which may also be referred to as numerology or by other various terms). Thus, the number of possible $c_{init}$ may exceed $2^{31}$. (In Equation 113, $n_{s,f}^\mu$ is the slot number in one transmission frame (within a frame), l the OFDM symbol number in the slot, and $N_{ID}^{CSI}$ the CSI-RS ID (scrambling ID) set by the higher layer.)

This may be prevented using a modulo operation as expressed in Equation 114.

$$c_{init}=(2^{10}\times((14n_{s,f}^\mu+l+1)(2N_{ID}^{CSI}+1)+N_{ID}^{CSI})) \mod 2^{31} \quad \text{Equation 114}$$

In Equation 114, $n_{s,f}$ is the slot number in one transmission frame, l the OFDM symbol number in the slot, and $N_{ID}^{CSI}$ the CSI-RS ID (scrambling ID) set by the higher layer. Referring to Equation 114, the UE needs to exactly know $n_{s,f}^\mu$ to receive the CSI-RS but, in the case of asynchronous network, the UE may sometimes be unaware of $n_{s,f}^\mu$. Thus, a modification may be made, such as Equation 115.

$$c_{init}(2^{10}\times(((14(n_{s,f}^\mu \mod\{N_{slot}^{frame,\mu}/M\}))+l+1)(2N_{ID}^{CSI}+1)+N_{ID}^{CSI})) \mod 2^{31} \quad \text{Equation 115}$$

In Equation 115, $n_{s,f}^\mu$ is the slot number in one transmission frame, l the OFDM symbol network in the slot, $N_{ID}^{CSI}$ the CSI-RS ID (scrambling ID) set by the iv higher layer, as one of 0 to ($2^{10}$-1), and $N_{slot}^{frame,\mu}$ is the number of slots in one frame, as determined by the SCS as shown in Table 4. Further, M in Equation 115 is a variable for adjusting the sequence initialization repetition periodicity, which may be 1) defined as a fixed value, 2) determined by a higher layer setting value, or 3) implicitly varied by other parameter or 4) implicitly varied depending on the usage of reference signal (RS).

{M=10/sequence repetition periodicity [ms]} is a representative example defining M as a fixed value. As an example, for 5 ms repetition, M=2 or, for 1 ms repetition, M=10.

As another example, as M, one of several candidates may be indicated by high layer signaling. For example, the base station may instruct the UE to use one of {1, 2, 10} or {1, 2, 5, 10} as M.

If M is agreed to be varied by other parameter, M may be varied by such parameter as the SCS value μ. For example, if μ1=0 or 1, i.e., SCS=15 kHz or 30 kHz, then M=10, and the sequence is repeated every 1 ms and, if μ=2 or 3 or 4, i.e., SCS=60 kHz or 120 kHz or 240 kHz, then M=2 so that the sequence is repeated every 5 ms. This is so intended considering that if the SCS value is large, i.e., in a high frequency bandwidth, the 5 ms boundary information may be known by the PBCH DmRS but, if the SCS value is small, i.e., in a low frequency band, it is hard to obtain timing information by the PBCH DMRS. It should be noted that the M values depending on μ may be mapped as different values if applied in practice.

As another example, M may be determined depending on the usage of RS. As an example, if the CSI-RS is configured for tracking (or if the higher layer parameter TRS-INFO of CSI-RS is set to 'ON), the CSI-RS is configured for beam management (or if the CSI-RS is configured for L1-RSRP reporting/computation), and/or if the CSI-RS is configured for CSI acquisition (or if the CSI-RS is connected with one or more reporting settings), the UE may use a sequence initialization periodicity of 10 ms assuming M=1. As another example, if a certain CSI-RS is configured for mobility, the UE may use a sequence initialization periodicity of 5 ms assuming M=2. Here, when the CSI-RS is configured for mobility may mean one of various conditions, e.g., 1) when the CSI-RS is associated/connected by the higher layer parameter RLM-CSIRS, 2) when the CSI-RS is configured by the higher layer parameter CSI-RS-ResourceConfig-Mobility or CSI-RS-Resource-Mobility, or 3) when the higher layer parameter useServingCellTiming is set to Disabled or OFF so that the serving cell timing is unable to be used for neighbor cell SS and RS measurement.

Meanwhile, it is apparent that the above-described M mapping per RS usage is a mere example and, upon system application, it may be modified/applied. Further, although the above examples have been individually described for ease of description, they are non-exclusive and two or more of them may simultaneously be applied. For example, while M is varied by the SCS value, it may simultaneously be influenced by the RS usage.

As an example, if a certain CSI-RS is configured for tracking, for beam management, or for CSI acquisition, the UE, under the assumption that M=1, may use a sequence initialization periodicity of 10 ms (M may be varied depending on the RS usage). As another example, if the CSI-RS is configured for mobility, the UE may determine M depending on the SCS value applied to the CSI-RS (for example, if μ=0 or 1, i.e., SCS=15 kHz or 30 kHz, then M=10, and the sequence is repeated every 1 ms and, if μ=2 or 3 or 4, i.e., SCS=60 kHz or 120 kHz or 240 kHz, then M=2 so that the sequence may be repeated every 5 ms).

By Equation 115, even in the asynchronous network (e.g., when the higher layer parameter useServingCellTiming is set to Disabled or OFF, the serving cell timing cannot be used for neighbor cell SS and RS measurement), the UE, without decoding another cell's PBCH (without the neighbor cell'$n_{s,f}^\mu$, but based on the current cell's $n_{s,f}^\mu$), may receive the other cell's CSI-RS.

The base station may use extra CSI-RS sequence generation methods similar to Equation 115 along with the CSI-RS sequence generation method of Equation 114 and may notify the UE what CSI-RS sequence generation method has been used.

In the case where two or more CSI-RS sequence generation methods are supported, a method for the base station to notify the UE what CSI-RS sequence generation method has been used may be 1) to explicitly indicate the selected CSI-RS sequence generation method by high layer signaling, e.g., RRC signaling, 2) to implicitly determine the CSI-RS sequence generation method according to the PDSCH transmission type, or 3) to implicitly determine the CSI-RS sequence generation method depending on the RS usage.

If the CSI-RS sequence generation method is indicated by RRC signaling, the base station may indicate one CSI-RS sequence generation method for all PDSCH transmissions, and it may also be apparent that a different CSI-RS sequence generation method may be indicated per PDSCH transmission type. Here, it should be noted that PDSCH transmission type may be used in various meanings, such as differentiated depending on slot-based scheduling (14 OFDM symbol based scheduling) or non-slot-based scheduling (2-/4-/7- OFDM symbol based scheduling), differentiated depending on service types, such as eMBB/mMTC/URLLC/LAA, differentiated according to RNTI types applied to the PDSCH, such as C-RNTI/P-RNTI/SI-RNTI, or differentiated according to synchronous network (when the higher layer parameter useServingCellTiming is set to Enable or ON so that the serving cell timing may be used for neighbor cell SS and RS measurement) or asynchronous network (when the higher layer parameter useServingCellTiming is set to Disabled or OFF so that the serving cell timing may be used for neighbor cell SS and RS measurement).

For example, in the case of synchronous network (when the higher layer parameter useServingCellTiming is set to Enable or ON so that the serving cell timing may be used for neighbor cell SS and RS measurement), Equation 114 is applied to all the CSI-RSs but, in the case of asynchronous network (when the higher layer parameter useServingCellTiming is set to Disabled or OFF so that the serving cell timing may be used for neighbor cell SS and RS measurement), Equation 114 is applied to CSI-RSs for CSI acquisition/beam management/time-frequency tracking while other methods similar to Equation 115 with a sequence generation repetition periodicity of 5 ms are applied to CSI-RSs for mobility (i.e., CSI-RSs from other cells for supporting L3 mobility) to facilitate the UE's mobility RS reception.

Among the above-described examples, the example of indicating a sequence generation method by high layer signaling includes a method for the base station to provide the UE with one or more subframe numbers (SFNs) or one or more SFN offsets by high layer signaling. For example, based on the SFN or one or more SFN offsets, the UE may apply $n_{s,f1}^{\mu}$ to CSI-RSs for CSI acquisition/beam management/time-frequency tracking in Equation 116 and apply $n_{s,f2}^{\mu}$ to CSI-RSs for mobility.

$$c_{init} = \begin{cases} (2^{10} \times ((14n_{s,f1}^{\mu} + l + 1)(2N_{ID}^{CSI} + 1) + N_{ID}^{CSI})) \mod 2^{31} \\ (2^{10} \times ((14n_{s,f2}^{\mu} + l + 1)(2N_{ID}^{CSI} + 1) + N_{ID}^{CSI})) \mod 2^{31} \end{cases}$$ Equation 116

Figure 7:
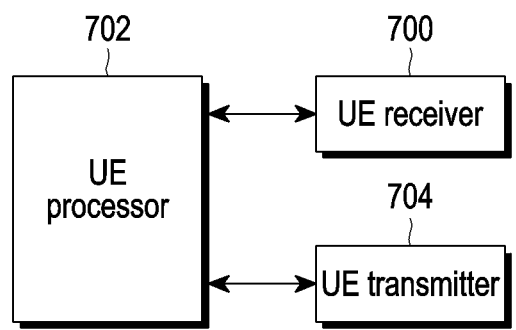
FIG. 7 is a block diagram illustrating an internal structure of a UE according to an embodiment of the disclosure.
Figure 8:
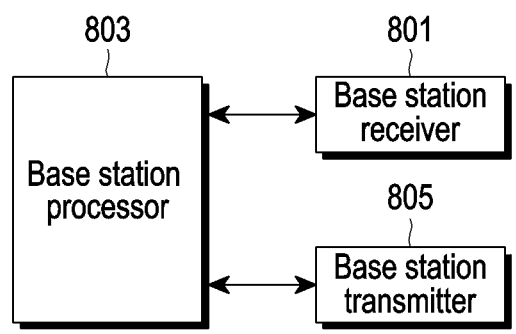
FIG. 8 is a block diagram illustrating an internal structure of a base station according to an embodiment of the disclosure.

Meanwhile, FIGS. 7 and 8 illustrate the respective transmitters, receivers, and processors of a UE and a base station to perform the above-described embodiments of the disclosure. To perform the above-described embodiments, the respective receivers, processors, and transmitters of the base station and UE need to operate according to embodiments.

Specifically, FIG. 7 is a block diagram illustrating an internal structure of a UE according to an embodiment of the disclosure. Referring to FIG. 7, a UE according to the disclosure may include a UE receiver 700, a UE transmitter 704, and a UE processor 702. The UE receiver 700 and the UE transmitter 704 may collectively be referred to as a transceiver according to an embodiment. The transceiver may transmit or receive signals to/from the base station. The signals may include control information and data. To that end, the transceiver may include a radio frequency (RF) transmitter for frequency-up converting and amplifying signals transmitted and an RF receiver for low-noise amplifying signals received and frequency-down converting the frequency of the received signals. The transceiver may receive signals via a radio channel, output the signals to the UE processor 702, and transmit signals output from the UE processor 702 via a radio channel. The UE processor 702 may control a series of processes for the UE to be able to operate according to the above-described embodiments. For example, the UE receiver 700 may receive a reference signal from the base station, and the UE processor 702 may control to interpret a method of applying the reference signal. Further, the UE transmitter 704 may also transmit a reference signal. Meanwhile, as an example, the UE processor 704 may include at least one processor (e.g., a central processing unit (CPU) or a graphics processing unit (GPU) or both). The UE 700 may further include a storage unit configured to store a basic program for operating the UE 700, application programs, control information or other data. The storage unit may include at least one type of storage medium of flash memory types, hard disk types, multimedia card micro types, card types of memories (e.g., SD or XD memory cards), magnetic memories, magnetic disks, or optical discs, random access memories (RAMs), static random access memories (SRAMs), read-only memories (ROMs), programmable read-only memories (PROMs), or electrically erasable programmable read-only memories (EEPROMs). The UE processor 702 may perform various operations using various programs, contents, or data stored in the storage unit.

FIG. 8 is a block diagram illustrating an internal structure of a base station according to an embodiment of the disclosure. Referring to FIG. 8, a base station according to the disclosure may include a base station receiver 801, a base station transmitter 805, and a base station processor 803. The base station receiver 801 and the base station transmitter 805 may collectively be referred to as a transceiver according to an embodiment. The transceiver may transmit or receive signals to/from the UE. The signals may include control information and data. To that end, the transceiver may include a radio frequency (RF) transmitter for frequency-up converting and amplifying signals transmitted and an RF receiver for low-noise amplifying signals received and frequency-down converting the frequency of the received signals. The transceiver may receive signals via a radio channel, output the signals to the base station processor 803, and transmit signals output from the base station processor 803 via a radio channel. The base station processor 803 may control a series of processes for the base station to be able to operate according to the above-described embodiments. For example, the base station processor 803 may determine the structure of the reference signal and control to generate configuration information of the reference signal to be transferred to the UE. Based on this, the base station processor 803 may generate a DMRS sequence. Thereafter, the base station transmitter 805 may transfer the reference signal and configuration information to the UE, and the base station receiver 801 may also receive the reference signal. Meanwhile, as an example, the UE processor 803 may include at least one processor (e.g., a central processing unit (CPU) or a graphics processing unit (GPU) or both). The UE 800 may further include a storage unit configured to store a basic program for operating the UE 800, application programs, control information or other data. The UE processor 803 may perform various operations using various programs, contents, or data stored in the storage unit.

The embodiments herein are provided merely for better understanding of the present disclosure, and the present disclosure should not be limited thereto or thereby. In other words, it is apparent to one of ordinary skill in the art that various changes may be made thereto without departing from the scope of the present disclosure. Further, the embodiments may be practiced in combination. For example, all of the embodiments of the disclosure may partially be combined and be operated by the base station and the UE.

Various embodiments of the present disclosure may be implemented in computer-readable codes on a computer-readable recording medium in particular points of view. The computer readable recording medium is a data storage device that may store data readable by a computer system. Examples of the computer readable recording medium may include read only memories (ROMs), random access memories (RAMs), compact disk-read only memories (CD-ROMs), magnetic tapes, floppy disks, optical data storage devices, and carrier waves (such as data transmission over the Internet). The computer readable recording medium may be distributed by computer systems over a network, and accordingly, the computer readable codes may be stored and executed in a distributed manner. Functional programs, codes, and code segments to attain various embodiments of the present disclosure may be readily interpreted by skilled programmers in the art to which the present disclosure pertains.

The apparatuses and methods according to embodiments of the disclosure may be implemented in hardware, software, or a combination of hardware and software. Such software may be recorded in volatile or non-volatile storage devices, such as ROMs, memories, such as RAMs, memory chips, memory devices, or integrated circuit devices, compact disks (CDs), DVDs, magnetic disks, magnetic tapes, or other optical or magnetic storage devices while retained in machine (e.g., computer)-readable storage media. The methods according to embodiments of the disclosure may be implemented by a computer or a portable terminal including a controller and a memory, and the memory may be an exemplary machine-readable storage medium that may properly retain program(s) containing instructions for implementing the embodiments of the disclosure.

Accordingly, the present disclosure encompasses a program containing codes for implementing the device or method set forth in the claims of this disclosure and a machine (e.g., computer)-readable storage medium storing the program. The program may be electronically transferred via any media such as communication signals transmitted through a wired or wireless connection and the present disclosure properly includes the equivalents thereof.

The embodiments herein are provided merely for better understanding of the present disclosure, and the present disclosure should not be limited thereto or thereby. The embodiments set forth herein are merely examples, and it will be apparent to one of ordinary skill in the art that various changes may be made thereto without departing from the scope of the disclosure. The scope of the disclosure should be defined by the following claims.

The invention claimed is:

1. A method of transmitting a reference signal by a base station in a wireless communication system, the method comprising:
   determining an initial sequence;
   generating a reference signal sequence using the initial sequence; and
   transmitting a channel state information reference signal (CSI-RS) corresponding to the generated reference signal sequence,
   wherein the initial sequence is determined using Equation 1:

$$c_{init}=(2^{10}\times(((14(n_{s,f}^{\mu}\bmod\{N_{slot}^{frame,\mu}/M\}))+l+1)(2N_{ID}^{CSI}+1)+N_{ID}^{CSI}))\bmod 2^{31} \quad \text{[Equation 1]}$$

where, $c_{init}$ is the initial sequence, $\mu$ is a subcarrier spacing (SCS) configuration, $N_{slot}^{frame,\mu}$ is a number of slots in a transmission frame for the SCS configuration, $n_{s,f}^{\mu}$ is a slot number in the transmission frame for the SCS configuration, l is a symbol number in a slot, $N_{ID}^{CSI}$ is a reference signal identifier (ID) of the CSI-RS, and M is a variable for determining a sequence initialization repetition periodicity of the initial sequence,
   wherein the reference signal identifier is a scrambling identifier (ID), and
   wherein the variable for determining the sequence initialization repetition periodicity of the initial sequence is set based on both the SCS configuration and a usage of the CSI-RS.

2. The method of claim 1, further comprising transmitting information indicating a method used to determine the initial sequence.

3. A base station configured to transmit a reference signal in a wireless communication system, comprising:
   a transceiver; and
   a processor configured to control the transceiver,
   wherein the processor is configured to:
      determine an initial sequence,
      generate a reference signal sequence using the initial sequence, and
      transmit a channel state information reference signal (CSI-RS) corresponding to the generated reference signal sequence,
   wherein the initial sequence is determined using Equation 1:

$$c_{init}=(2^{10}\times(((14(n_{s,f}^{\mu}\bmod\{N_{slot}^{frame,\mu}/M\}))+l+1)(2N_{ID}^{CSI}+1)+N_{ID}^{CSI}))\bmod 2^{31} \quad \text{[Equation 1]}$$

where, $c_{init}$ is the initial sequence, $\mu$ is a subcarrier spacing (SCS) configuration, $N_{slot}^{frame,\mu}$ is a number of slots in a transmission frame for the SCS configuration, $n_{s,f}^{\mu}$ is a slot number in the transmission frame for the SCS configuration, l is a symbol number in a slot, $N_{ID}^{CSI}$ is a reference signal identifier (ID) of the CSI-RS, and M is a variable for determining a sequence initialization repetition periodicity of the initial sequence,
   wherein the reference signal identifier is a scrambling identifier (ID), and
   wherein the variable for determining the sequence initialization repetition periodicity of the initial sequence is set based on both the SCS configuration and a usage of the CSI-RS.

4. The base station of claim 3,
   wherein the processor is further configured to transmit information indicating a method used to determine the initial sequence through the transceiver.

5. A method of receiving a reference signal by a user equipment (UE) in a wireless communication system, the method comprising:
   receiving a channel state information reference signal (CSI-RS) corresponding to a reference signal sequence,
   wherein the reference signal sequence is generated using an initial sequence,
   wherein the initial sequence is determined using Equation 1:

$$c_{init}=(2^{10}\times(((14(n_{s,f}^{\mu}\bmod\{N_{slot}^{frame,\mu}/M\}))+l+1)(2N_{ID}^{CSI}+1)+N_{ID}^{CSI}))\bmod 2^{31} \quad \text{[Equation 1]}$$

where, $c_{init}$ is the initial sequence, $\mu$ is a subcarrier spacing (SCS) configuration, $N_{slot}^{frame,\mu}$ is a number of slots in a transmission frame for the SCS configuration, $n_{s,f}^{\mu}$ is a slot number in the transmission frame for the SCS configuration, l is a symbol number in a slot, $N_{ID}^{CSI}$ is a reference signal identifier (ID) of the CSI-RS, and M is a variable for determining a sequence initialization repetition periodicity of the initial sequence, wherein the reference signal identifier is a scrambling identifier (ID), and wherein the variable for determining the sequence initialization repetition periodicity of the initial sequence is set based on both the SCS configuration parameter and a usage of the CSI-RS.

6. A UE configured to receive a reference signal in a wireless communication system, comprising:
   a transceiver; and
   a processor configured to control the transceiver to receive a channel state information reference signal (CSI-RS) corresponding to a reference signal sequence,
   wherein the reference signal sequence is generated using an initial sequence, wherein the initial sequence is determined using Equation 1:

$$c_{init} = (2^{10} \times ((14(n_{s,f}^{\mu} \bmod \{N_{slot}^{frame,\mu}/M\})) + l + 1)(2N_{ID}^{CSI} + 1) + N_{ID}^{CSI})) \bmod 2^{31}$$ [Equation 1]

where, $c_{init}$ is the initial sequence, $\mu$ is a subcarrier spacing (SCS) configuration, $N_{slot}^{frame,\mu}$ is a number of slots in a transmission frame for the SCS configuration $n_{s,f}^{\mu}$ is a slot number in the transmission frame for the SCS configuration, l is a symbol number in a slot, $N_{ID}^{CSI}$ is a reference signal identifier (ID) of the CSI-RS, and M is a variable for determining a sequence initialization repetition periodicity of the initial sequence, wherein the reference signal identifier is a scrambling identifier (ID), and wherein the variable for determining the sequence initialization repetition periodicity of the initial sequence is set based on both the SCS configuration parameter and a usage of the CSI-RS.

* * * * *